(12) United States Patent
Putman et al.

(10) Patent No.: US 12,125,236 B2
(45) Date of Patent: Oct. 22, 2024

(54) SYSTEMS, METHODS, AND MEDIA FOR MANUFACTURING PROCESSES

(71) Applicant: Nanotronics Imaging, Inc., Cuyahoga Falls, OH (US)

(72) Inventors: Matthew C. Putman, Brooklyn, NY (US); Vadim Pinskiy, Wayne, NJ (US); Andrew Sundstrom, Brooklyn, NY (US); Aswin Raghav Nirmaleswaran, Brooklyn, NY (US); Eun-Sol Kim, Cliffside Park, NJ (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 335 days.

(21) Appl. No.: 17/195,746

(22) Filed: Mar. 9, 2021

(65) Prior Publication Data

US 2021/0192779 A1    Jun. 24, 2021

Related U.S. Application Data

(63) Continuation-in-part of application No. 17/091,393, filed on Nov. 6, 2020.
(Continued)

(51) Int. Cl.
*G06T 7/73* (2017.01)
*G05B 19/402* (2006.01)
(Continued)

(52) U.S. Cl.
CPC ............. *G06T 7/73* (2017.01); *G05B 19/402* (2013.01); *G05B 19/40932* (2013.01); *G06N 20/00* (2019.01); *G06T 2207/30164* (2013.01)

(58) Field of Classification Search
CPC .......... H01L 22/20; G07C 3/14; G01B 11/24; G05B 19/41875; G06T 7/001;
(Continued)

(56) References Cited

U.S. PATENT DOCUMENTS 4,056,716 A    11/1977    Baxter et al.
4,433,385 A    2/1984    De Gasperi et al.
(Continued)

FOREIGN PATENT DOCUMENTS

AU    2002359881 A1    7/2003
CN    1371489    9/2002
(Continued)

OTHER PUBLICATIONS

PCT International Application No. PCT/US21/21440, International Search Report and Written Opinion of the International Searching Authority, dated May 20, 2021, 10 pages.
(Continued)

*Primary Examiner* — Hoa Q Pham
(74) *Attorney, Agent, or Firm* — DLA PIPER LLP (US)

(57) ABSTRACT

A manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to dynamically adjust processing parameters of each step of the multi-step manufacturing process to achieve a desired final quality metric for the component.

17 Claims, 9 Drawing Sheets

Related U.S. Application Data

(60) Provisional application No. 62/986,987, filed on Mar. 9, 2020, provisional application No. 62/932,063, filed on Nov. 7, 2019, provisional application No. 62/931,448, filed on Nov. 6, 2019, provisional application No. 62/931,453, filed on Nov. 6, 2019.

(51) Int. Cl.
  *G05B 19/4093* (2006.01)
  *G06N 20/00* (2019.01)

(58) Field of Classification Search
  CPC ...... G06N 99/005; G06N 5/025; G06N 7/005; G06N 3/04; G06K 9/6269; G06F 17/30707
  USPC .......................................... 382/152; 700/109
  See application file for complete search history.

(56) References Cited

U.S. PATENT DOCUMENTS

| | | | |
|---|---|---|---|
| 5,027,295 | A | 6/1991 | Yotsuya |
| 5,808,432 | A | 9/1998 | Inoue et al. |
| 5,815,198 | A | 9/1998 | Vachtsevanos et al. |
| 6,240,633 | B1 | 6/2001 | Kent et al. |
| 6,266,436 | B1 | 7/2001 | Bett et al. |
| 6,650,779 | B2 | 11/2003 | Vachtesvanos et al. |
| 6,757,571 | B1 | 6/2004 | Toyama |
| 7,149,337 | B2 | 12/2006 | Michaelis et al. |
| 7,551,274 | B1 | 6/2009 | Wornson et al. |
| 8,185,217 | B2 | 5/2012 | Thiele |
| 8,612,043 | B2 | 12/2013 | Moyne et al. |
| 8,909,926 | B2 | 12/2014 | Brandt et al. |
| 9,945,264 | B2 | 4/2018 | Wichmann et al. |
| 9,977,425 | B1 | 5/2018 | McCann et al. |
| 10,061,300 | B1 | 8/2018 | Coffman et al. |
| 10,102,495 | B1 | 10/2018 | Zhang et al. |
| 10,481,579 | B1 | 11/2019 | Putman et al. |
| 11,117,328 | B2 | 9/2021 | Hough et al. |
| 11,156,982 | B2 | 10/2021 | Putman et al. |
| 11,156,991 | B2 | 10/2021 | Putman et al. |
| 11,156,992 | B2 | 10/2021 | Putman et al. |
| 11,209,795 | B2 | 12/2021 | Putman et al. |
| 11,675,330 | B2 | 6/2023 | Putman et al. |
| 2002/0002414 | A1 | 1/2002 | Hsiung et al. |
| 2002/0143417 | A1 | 10/2002 | Ito et al. |
| 2003/0061004 | A1 | 3/2003 | Discenzo |
| 2004/0030431 | A1 | 2/2004 | Popp et al. |
| 2004/0070509 | A1 | 4/2004 | Grace et al. |
| 2005/0267607 | A1 | 12/2005 | Paik |
| 2006/0013505 | A1 | 1/2006 | Yau et al. |
| 2006/0058898 | A1 | 3/2006 | Emigholz et al. |
| 2006/0149407 | A1 | 7/2006 | Markham et al. |
| 2007/0005525 | A1 | 1/2007 | Collette, III et al. |
| 2007/0036421 | A1 | 2/2007 | Toba et al. |
| 2007/0047797 | A1 | 3/2007 | Vilella |
| 2007/0177787 | A1 | 8/2007 | Maeda et al. |
| 2008/0100570 | A1 | 5/2008 | Friedrich et al. |
| 2008/0276128 | A1 | 11/2008 | Lin et al. |
| 2008/0300709 | A1 | 12/2008 | Collette, III et al. |
| 2009/0158577 | A1 | 6/2009 | Schweikle |
| 2009/0198464 | A1 | 8/2009 | Clarke et al. |
| 2009/0242513 | A1 | 10/2009 | Funk et al. |
| 2009/0281753 | A1 | 11/2009 | Noy |
| 2010/0106458 | A1 | 4/2010 | Leu et al. |
| 2010/0131202 | A1 | 5/2010 | Dannevik et al. |
| 2011/0141265 | A1 | 6/2011 | Holtkamp et al. |
| 2012/0151585 | A1 | 6/2012 | Lamastra et al. |
| 2012/0304007 | A1 | 11/2012 | Hanks et al. |
| 2013/0031037 | A1 | 1/2013 | Brandt et al. |
| 2013/0339919 | A1 | 12/2013 | Baseman et al. |
| 2014/0082730 | A1 | 3/2014 | Vashst et al. |
| 2014/0247347 | A1 | 9/2014 | McNeill et al. |
| 2014/0336785 | A1 | 11/2014 | Asenjo et al. |
| 2015/0045928 | A1 | 2/2015 | Perez et al. |
| 2015/0067844 | A1 | 3/2015 | Brandt et al. |
| 2015/0096022 | A1 | 4/2015 | Vincent et al. |
| 2015/0184549 | A1 | 7/2015 | Pamujula et al. |
| 2015/0185716 | A1 | 7/2015 | Wichmann et al. |
| 2015/0213369 | A1 | 7/2015 | Brandt et al. |
| 2015/0286202 | A1 | 10/2015 | Amano et al. |
| 2015/0324329 | A1 | 11/2015 | Blevins et al. |
| 2016/0170996 | A1 | 6/2016 | Frank et al. |
| 2016/0253618 | A1 | 9/2016 | Imazawa et al. |
| 2016/0259318 | A1 | 9/2016 | Vogt et al. |
| 2016/0261465 | A1 | 9/2016 | Gupta et al. |
| 2016/0300338 | A1 | 10/2016 | Zafar et al. |
| 2016/0330222 | A1 | 11/2016 | Brandt et al. |
| 2016/0352762 | A1 | 12/2016 | Friedlander et al. |
| 2017/0034205 | A1 | 2/2017 | Canedo et al. |
| 2017/0093897 | A1 | 3/2017 | Cochin et al. |
| 2017/0102694 | A1 | 4/2017 | Enver et al. |
| 2017/0102696 | A1 | 4/2017 | Bell et al. |
| 2017/0109646 | A1 | 4/2017 | David |
| 2017/0149820 | A1 | 5/2017 | Ruvio et al. |
| 2017/0156674 | A1 | 6/2017 | Hochman |
| 2017/0169219 | A1 | 6/2017 | Ogawa et al. |
| 2017/0255723 | A1 | 9/2017 | Asenjo et al. |
| 2017/0264629 | A1 | 9/2017 | Wei et al. |
| 2018/0005083 | A1 | 1/2018 | Georgescu et al. |
| 2018/0033130 | A1 | 2/2018 | Kimura et al. |
| 2018/0079125 | A1 | 3/2018 | Perez et al. |
| 2018/0114121 | A1 | 4/2018 | Rana et al. |
| 2018/0144248 | A1 | 5/2018 | Lu et al. |
| 2018/0150070 | A1 | 5/2018 | Johnson et al. |
| 2018/0157831 | A1 | 6/2018 | Abbaszadeh et al. |
| 2018/0165602 | A1 | 6/2018 | Van Seijen et al. |
| 2018/0180085 | A1 | 6/2018 | Watanabe et al. |
| 2018/0188704 | A1 | 7/2018 | Cella et al. |
| 2018/0188714 | A1 | 7/2018 | Cella et al. |
| 2018/0188715 | A1 | 7/2018 | Cella et al. |
| 2018/0210425 | A1 | 7/2018 | Cella et al. |
| 2018/0210426 | A1 | 7/2018 | Cella et al. |
| 2018/0210427 | A1 | 7/2018 | Cella et al. |
| 2018/0248905 | A1 | 8/2018 | Côte et al. |
| 2018/0253073 | A1 | 9/2018 | Cella et al. |
| 2018/0253074 | A1 | 9/2018 | Cella et al. |
| 2018/0253075 | A1 | 9/2018 | Cella et al. |
| 2018/0253082 | A1 | 9/2018 | Asenjo et al. |
| 2018/0255374 | A1 | 9/2018 | Cella et al. |
| 2018/0255375 | A1 | 9/2018 | Cella et al. |
| 2018/0255376 | A1 | 9/2018 | Cella et al. |
| 2018/0255377 | A1 | 9/2018 | Cella et al. |
| 2018/0255378 | A1 | 9/2018 | Cella et al. |
| 2018/0255379 | A1 | 9/2018 | Cella et al. |
| 2018/0255380 | A1 | 9/2018 | Cella et al. |
| 2018/0255381 | A1 | 9/2018 | Cella et al. |
| 2018/0255382 | A1 | 9/2018 | Cella et al. |
| 2018/0255383 | A1 | 9/2018 | Cella et al. |
| 2018/0262528 | A1 | 9/2018 | Jain |
| 2018/0276375 | A1 | 9/2018 | Arov et al. |
| 2018/0284735 | A1 | 10/2018 | Cella et al. |
| 2018/0284736 | A1 | 10/2018 | Cella et al. |
| 2018/0284737 | A1 | 10/2018 | Cella et al. |
| 2018/0284741 | A1 | 10/2018 | Cella et al. |
| 2018/0284742 | A1 | 10/2018 | Cella et al. |
| 2018/0284743 | A1 | 10/2018 | Cella et al. |
| 2018/0284744 | A1 | 10/2018 | Cella et al. |
| 2018/0284745 | A1 | 10/2018 | Cella et al. |
| 2018/0284746 | A1 | 10/2018 | Cella et al. |
| 2018/0284747 | A1 | 10/2018 | Cella et al. |
| 2018/0284749 | A1 | 10/2018 | Cella et al. |
| 2018/0284752 | A1 | 10/2018 | Cella et al. |
| 2018/0284753 | A1 | 10/2018 | Cella et al. |
| 2018/0284754 | A1 | 10/2018 | Cella et al. |
| 2018/0284755 | A1 | 10/2018 | Cella et al. |
| 2018/0284756 | A1 | 10/2018 | Cella et al. |
| 2018/0284757 | A1 | 10/2018 | Cella et al. |
| 2018/0284758 | A1 | 10/2018 | Cella et al. |
| 2018/0292811 | A1 | 10/2018 | Baseman et al. |
| 2018/0292812 | A1 | 10/2018 | Baseman et al. |
| 2018/0299878 | A1 | 10/2018 | Cella et al. |
| 2018/0316719 | A1 | 11/2018 | Schneider et al. |
| 2018/0321666 | A1 | 11/2018 | Cella et al. |

(56) References Cited

U.S. PATENT DOCUMENTS

| | | |
|---|---|---|
| 2018/0321667 A1 | 11/2018 | Cella et al. |
| 2018/0321672 A1 | 11/2018 | Cella et al. |
| 2018/0358271 A1 | 12/2018 | David |
| 2018/0367550 A1 | 12/2018 | Musuvathi et al. |
| 2018/0376067 A1 | 12/2018 | Martineau |
| 2019/0020669 A1 | 1/2019 | Glatfelter et al. |
| 2019/0025805 A1 | 1/2019 | Cella et al. |
| 2019/0025806 A1 | 1/2019 | Cella et al. |
| 2019/0025812 A1 | 1/2019 | Cella et al. |
| 2019/0033845 A1 | 1/2019 | Cella et al. |
| 2019/0033846 A1 | 1/2019 | Cella et al. |
| 2019/0033847 A1 | 1/2019 | Cella et al. |
| 2019/0033848 A1 | 1/2019 | Cella et al. |
| 2019/0033849 A1 | 1/2019 | Cella et al. |
| 2019/0041836 A1 | 2/2019 | Cella et al. |
| 2019/0041840 A1 | 2/2019 | Cella et al. |
| 2019/0041841 A1 | 2/2019 | Cella et al. |
| 2019/0041843 A1 | 2/2019 | Cella et al. |
| 2019/0041844 A1 | 2/2019 | Cella et al. |
| 2019/0041845 A1 | 2/2019 | Cella et al. |
| 2019/0041846 A1 | 2/2019 | Cella et al. |
| 2019/0064766 A1 | 2/2019 | Friebolin et al. |
| 2019/0064792 A1 | 2/2019 | Cella et al. |
| 2019/0068618 A1 | 2/2019 | Mestha et al. |
| 2019/0068620 A1 | 2/2019 | Avrahami et al. |
| 2019/0072922 A1 | 3/2019 | Cella et al. |
| 2019/0072923 A1 | 3/2019 | Cella et al. |
| 2019/0072924 A1 | 3/2019 | Cella et al. |
| 2019/0072925 A1 | 3/2019 | Cella et al. |
| 2019/0072926 A1 | 3/2019 | Cella et al. |
| 2019/0072928 A1 | 3/2019 | Cella et al. |
| 2019/0073585 A1 | 3/2019 | Pu et al. |
| 2019/0079483 A1 | 3/2019 | Cella et al. |
| 2019/0089722 A1 | 3/2019 | Ciocarlie et al. |
| 2019/0094829 A1 | 3/2019 | Cella et al. |
| 2019/0094842 A1 | 3/2019 | Lee et al. |
| 2019/0094843 A1 | 3/2019 | Lee et al. |
| 2019/0104138 A1 | 4/2019 | Storms et al. |
| 2019/0107816 A1 | 4/2019 | Cella et al. |
| 2019/0114756 A1 | 4/2019 | Weiss et al. |
| 2019/0118300 A1 | 4/2019 | Penny et al. |
| 2019/0121339 A1 | 4/2019 | Cella et al. |
| 2019/0121340 A1 | 4/2019 | Cella et al. |
| 2019/0121342 A1 | 4/2019 | Cella et al. |
| 2019/0121343 A1 | 4/2019 | Cella et al. |
| 2019/0121344 A1 | 4/2019 | Cella et al. |
| 2019/0121345 A1 | 4/2019 | Cella et al. |
| 2019/0121346 A1 | 4/2019 | Cella et al. |
| 2019/0121347 A1 | 4/2019 | Cella et al. |
| 2019/0121349 A1 | 4/2019 | Cella et al. |
| 2019/0129404 A1 | 5/2019 | Cella et al. |
| 2019/0129405 A1 | 5/2019 | Cella et al. |
| 2019/0129406 A1 | 5/2019 | Cella et al. |
| 2019/0129408 A1 | 5/2019 | Cella et al. |
| 2019/0129409 A1 | 5/2019 | Cella et al. |
| 2019/0137985 A1 | 5/2019 | Cella et al. |
| 2019/0137987 A1 | 5/2019 | Cella et al. |
| 2019/0137988 A1 | 5/2019 | Cella et al. |
| 2019/0137989 A1 | 5/2019 | Cella et al. |
| 2019/0138897 A1 | 5/2019 | Xu et al. |
| 2019/0138932 A1 | 5/2019 | Akella et al. |
| 2019/0146474 A1 | 5/2019 | Cella et al. |
| 2019/0146476 A1 | 5/2019 | Cella et al. |
| 2019/0146477 A1 | 5/2019 | Cella et al. |
| 2019/0146481 A1 | 5/2019 | Cella et al. |
| 2019/0146482 A1 | 5/2019 | Cella et al. |
| 2019/0155272 A1 | 5/2019 | Cella et al. |
| 2019/0179277 A1 | 6/2019 | Cella et al. |
| 2019/0179278 A1 | 6/2019 | Cella et al. |
| 2019/0179279 A1 | 6/2019 | Cella et al. |
| 2019/0179300 A1 | 6/2019 | Cella et al. |
| 2019/0179301 A1 | 6/2019 | Cella et al. |
| 2019/0180153 A1 | 6/2019 | Buckler et al. |
| 2019/0187646 A1 | 6/2019 | Cella et al. |
| 2019/0187647 A1 | 6/2019 | Cella et al. |
| 2019/0187648 A1 | 6/2019 | Cella et al. |
| 2019/0187649 A1 | 6/2019 | Cella et al. |
| 2019/0187650 A1 | 6/2019 | Cella et al. |
| 2019/0187651 A1 | 6/2019 | Cella et al. |
| 2019/0187652 A1 | 6/2019 | Cella et al. |
| 2019/0187653 A1 | 6/2019 | Cella et al. |
| 2019/0187654 A1 | 6/2019 | Cella et al. |
| 2019/0187655 A1 | 6/2019 | Cella et al. |
| 2019/0187656 A1 | 6/2019 | Cella et al. |
| 2019/0187657 A1 | 6/2019 | Cella et al. |
| 2019/0187680 A1 | 6/2019 | Cella et al. |
| 2019/0187681 A1 | 6/2019 | Cella et al. |
| 2019/0187682 A1 | 6/2019 | Cella et al. |
| 2019/0187683 A1 | 6/2019 | Cella et al. |
| 2019/0187684 A1 | 6/2019 | Cella et al. |
| 2019/0187685 A1 | 6/2019 | Cella et al. |
| 2019/0187686 A1 | 6/2019 | Cella et al. |
| 2019/0187687 A1 | 6/2019 | Cella et al. |
| 2019/0187688 A1 | 6/2019 | Cella et al. |
| 2019/0187689 A1 | 6/2019 | Cella et al. |
| 2019/0187690 A1 | 6/2019 | Cella et al. |
| 2019/0197236 A1 | 6/2019 | Niculescu-Mizil et al. |
| 2019/0213099 A1 | 7/2019 | Schmidt et al. |
| 2019/0219995 A1 | 7/2019 | Cella et al. |
| 2019/0219996 A1 | 7/2019 | Cella et al. |
| 2019/0227536 A1 | 7/2019 | Cella et al. |
| 2019/0227537 A1 | 7/2019 | Cella et al. |
| 2019/0230099 A1 | 7/2019 | Mestha et al. |
| 2019/0230106 A1 | 7/2019 | Abbaszadeh et al. |
| 2019/0235461 A1 | 8/2019 | Cella et al. |
| 2019/0235462 A1 | 8/2019 | Cella et al. |
| 2019/0238568 A1 | 8/2019 | Goswami et al. |
| 2019/0243323 A1 | 8/2019 | Cella et al. |
| 2019/0243346 A1 | 8/2019 | Baseman et al. |
| 2019/0286111 A1 | 9/2019 | Yennie et al. |
| 2019/0286892 A1 | 9/2019 | Li et al. |
| 2019/0294869 A1 | 9/2019 | Naphade et al. |
| 2019/0295887 A1 | 9/2019 | Trickett et al. |
| 2019/0295890 A1 | 9/2019 | Clark et al. |
| 2019/0295891 A1 | 9/2019 | Clark et al. |
| 2019/0295906 A1 | 9/2019 | Clark et al. |
| 2019/0299536 A1 | 10/2019 | Putman et al. |
| 2019/0302707 A1 | 10/2019 | Guo et al. |
| 2019/0339684 A1 | 11/2019 | Cella et al. |
| 2019/0339685 A1 | 11/2019 | Cella et al. |
| 2019/0339686 A1 | 11/2019 | Cella et al. |
| 2019/0339687 A1 | 11/2019 | Cella et al. |
| 2019/0362480 A1 | 11/2019 | Diao et al. |
| 2019/0379677 A1 | 12/2019 | Zenz et al. |
| 2019/0384250 A1 | 12/2019 | Cella et al. |
| 2019/0386595 A1 | 12/2019 | Fujita et al. |
| 2019/0391550 A1 | 12/2019 | Cella et al. |
| 2019/0391551 A1 | 12/2019 | Cella et al. |
| 2019/0391552 A1 | 12/2019 | Cella et al. |
| 2020/0012248 A1 | 1/2020 | Cella et al. |
| 2020/0013156 A1 | 1/2020 | Weiss et al. |
| 2020/0019154 A1 | 1/2020 | Cella et al. |
| 2020/0019155 A1 | 1/2020 | Cella et al. |
| 2020/0026270 A1 | 1/2020 | Cella et al. |
| 2020/0076838 A1 | 3/2020 | Mestha et al. |
| 2020/0081423 A1 | 3/2020 | Clark et al. |
| 2020/0083070 A1 | 3/2020 | Clark et al. |
| 2020/0083074 A1 | 3/2020 | Clark et al. |
| 2020/0083080 A1 | 3/2020 | Clark et al. |
| 2020/0096986 A1 | 3/2020 | Cella et al. |
| 2020/0096987 A1 | 3/2020 | Cella et al. |
| 2020/0096988 A1 | 3/2020 | Cella et al. |
| 2020/0096989 A1 | 3/2020 | Cella et al. |
| 2020/0096990 A1 | 3/2020 | Cella et al. |
| 2020/0096992 A1 | 3/2020 | Cella et al. |
| 2020/0096993 A1 | 3/2020 | Cella et al. |
| 2020/0096994 A1 | 3/2020 | Cella et al. |
| 2020/0096995 A1 | 3/2020 | Cella et al. |
| 2020/0096996 A1 | 3/2020 | Cella et al. |
| 2020/0096997 A1 | 3/2020 | Cella et al. |
| 2020/0096998 A1 | 3/2020 | Cella et al. |
| 2020/0099707 A1 | 3/2020 | Abbaszadeh et al. |
| 2020/0103890 A1 | 4/2020 | Cella et al. |
| 2020/0103891 A1 | 4/2020 | Cella et al. |

(56) References Cited

U.S. PATENT DOCUMENTS

| | | |
|---|---|---|
| 2020/0103892 A1 | 4/2020 | Cella et al. |
| 2020/0103893 A1 | 4/2020 | Cella et al. |
| 2020/0110398 A1 | 4/2020 | Cella et al. |
| 2020/0110399 A1 | 4/2020 | Cella et al. |
| 2020/0110400 A1 | 4/2020 | Cella et al. |
| 2020/0110401 A1 | 4/2020 | Cella et al. |
| 2020/0111689 A1 | 4/2020 | Banna et al. |
| 2020/0117180 A1 | 4/2020 | Cella et al. |
| 2020/0125978 A1 | 4/2020 | Abbaszadeh et al. |
| 2020/0166909 A1 | 5/2020 | Noone et al. |
| 2020/0175171 A1 | 6/2020 | Rieger et al. |
| 2020/0310380 A1 | 10/2020 | Sun et al. |
| 2020/0314128 A1 | 10/2020 | Hild |
| 2020/0333777 A1 | 10/2020 | Maruyama |
| 2020/0401120 A1 | 12/2020 | Putman et al. |
| 2021/0069990 A1* | 3/2021 | Hough ............... B29C 64/393 |
| 2021/0118730 A1 | 4/2021 | Clark et al. |
| 2021/0125863 A1 | 4/2021 | Clark et al. |
| 2021/0132593 A1* | 5/2021 | Sundstrom ............. G06T 7/73 |
| 2021/0138735 A1* | 5/2021 | Limoge ............. G06T 7/0004 |
| 2021/0168976 A1 | 6/2021 | Kawai et al. |
| 2021/0192779 A1 | 6/2021 | Putman et al. |
| 2021/0263495 A1 | 8/2021 | Putman et al. |
| 2021/0311440 A1* | 10/2021 | Sundstrom ........... G06T 1/0014 |
| 2021/0378190 A1* | 12/2021 | Limoge ............. G05B 13/024 |
| 2021/0394456 A1 | 12/2021 | Hough et al. |
| 2022/0011727 A1 | 1/2022 | Hlavac et al. |
| 2022/0236709 A1 | 7/2022 | Cella et al. |
| 2022/0308653 A1 | 9/2022 | Pu et al. |
| 2023/0182235 A1 | 6/2023 | Penny et al. |

FOREIGN PATENT DOCUMENTS

| | | |
|---|---|---|
| CN | 1705938 A | 12/2005 |
| CN | 101771702 A | 7/2010 |
| CN | 102466566 A | 5/2012 |
| CN | 102778858 A | 11/2012 |
| CN | 103324175 | 9/2013 |
| CN | 104656602 A | 5/2015 |
| CN | 105094030 | 11/2015 |
| CN | 105264640 | 1/2016 |
| CN | 105488806 A | 4/2016 |
| CN | 105960777 A | 9/2016 |
| CN | 106687981 A | 5/2017 |
| CN | 106857797 | 6/2017 |
| CN | 106921676 A | 7/2017 |
| CN | 107389701 | 11/2017 |
| CN | 107835982 A | 3/2018 |
| CN | 107851047 A | 3/2018 |
| CN | 107886500 | 4/2018 |
| CN | 107976969 A | 5/2018 |
| CN | 10853078 | 7/2018 |
| CN | 108604393 | 9/2018 |
| CN | 108780314 A | 11/2018 |
| CN | 108885446 | 11/2018 |
| CN | 109167796 | 1/2019 |
| CN | 109561112 | 4/2019 |
| CN | 109766992 | 5/2019 |
| CN | 110381045 | 10/2019 |
| CN | 110431503 | 11/2019 |
| CN | 110647414 A | 1/2020 |
| CN | 110851834 A | 2/2020 |
| EP | 0671677 | 3/1999 |
| EP | 2585248 B1 | 10/2017 |
| EP | 4028228 A1 | 7/2022 |
| JP | 5-108126 | 4/1993 |
| JP | H05322789 | 12/1993 |
| JP | 2001100838 A | 4/2001 |
| JP | 2002230337 A | 8/2002 |
| JP | 2003167613 A | 6/2003 |
| JP | 2004104576 A | 4/2004 |
| JP | 2004178388 | 6/2004 |
| JP | 2005211105 A | 8/2005 |
| JP | 2005250990 A | 9/2005 |
| JP | 2007280366 A | 10/2007 |
| JP | 2008009868 A | 1/2008 |
| JP | 2008512792 A | 4/2008 |
| JP | 2008146621 A | 6/2008 |
| JP | 2009134623 A | 6/2009 |
| JP | 2009282740 | 12/2009 |
| JP | 4601492 | 12/2010 |
| JP | 4621773 B2 | 1/2011 |
| JP | 2015099022 A | 5/2015 |
| JP | 2015181024 A | 10/2015 |
| JP | 2016-157357 | 9/2016 |
| JP | 5984096 B2 | 9/2016 |
| JP | 2017091091 A | 5/2017 |
| JP | 6224873 B1 | 11/2017 |
| JP | 2017211713 A | 11/2017 |
| JP | 2018022210 A | 2/2018 |
| JP | 2018-103309 | 7/2018 |
| JP | 6356909 | 7/2018 |
| JP | 2018139101 A | 9/2018 |
| JP | 2019061565 A | 4/2019 |
| JP | 6527295 B2 | 6/2019 |
| JP | 2019095859 A | 6/2019 |
| JP | 2019145042 A | 8/2019 |
| JP | 2020-035420 | 3/2020 |
| JP | 2020114597 A | 7/2020 |
| JP | 2022522159 | 4/2022 |
| KR | 10-2011-0069934 | 6/2011 |
| KR | 10-2015-0075742 | 7/2015 |
| KR | 101568879 B1 | 11/2015 |
| KR | 10-2017-0127430 | 11/2017 |
| KR | 10-2019-0000182 | 1/2019 |
| TW | 454137 | 9/2001 |
| TW | 489443 | 6/2002 |
| TW | 200307972 | 12/2003 |
| TW | 200415453 | 8/2004 |
| TW | 200629117 | 8/2006 |
| TW | 200715080 | 4/2007 |
| TW | 200724237 | 7/2007 |
| TW | 201212140 | 3/2012 |
| TW | I409658 B | 9/2013 |
| TW | 201339069 A | 10/2013 |
| TW | 201717144 | 5/2017 |
| TW | 201723914 A | 7/2017 |
| TW | 201809640 A | 3/2018 |
| TW | 201816717 | 5/2018 |
| TW | 201839626 A | 11/2018 |
| TW | 201842403 A | 12/2018 |
| TW | 201908896 | 3/2019 |
| TW | 201939634 A | 10/2019 |
| TW | 201941194 A | 10/2019 |
| TW | 201941328 A | 10/2019 |
| TW | 202001678 | 1/2020 |
| WO | 03/060812 | 7/2003 |
| WO | 2005093535 A3 | 11/2005 |
| WO | 2018044410 A1 | 3/2018 |
| WO | 2018055754 A1 | 3/2018 |
| WO | 2018061842 A1 | 4/2018 |
| WO | 2018062398 A1 | 4/2018 |
| WO | 2018105296 | 6/2018 |
| WO | 2018217903 | 11/2018 |
| WO | 2019012653 A1 | 1/2019 |
| WO | 2019058532 A1 | 3/2019 |
| WO | 2019/182913 | 9/2019 |
| WO | 2019195039 A1 | 10/2019 |

OTHER PUBLICATIONS

Office Action for Japanese Patent Application No. 2021575060, dated Oct. 13, 2023, 3 pages.

Office Action for Japanese Patent Application No. 2022529027, dated Oct. 13, 2023, 3 pages.

Office Action for Japanese Patent Application No. 2022-553668, dated Sep. 1, 2023, 9 Pages.

Supplementary European Search Report for European Patent Application No. 21760563.3, dated Jul. 18, 2023, 12 Pages.

Vollmer, et al., "Cyber-physical system security with deceptive virtual hosts for industrial control networks," IEEE Transactions on Industrial Informatics 10.2, May 2014, pp. 1337-1347.

(56) References Cited

OTHER PUBLICATIONS

SPC for Excel: "Control Chart Rules and Interpretation," BPI Consulting, LLC, Mar. 2016, 20 Pages, [Retrieved on Jul. 23, 2019], Retrieved From URL: https://www.spcforexcel.com/knowledge/control-chart-basics/control-chart-rules-interpretation.
SPC for Excel: "Interpreting Control Charts," BPI Consulting, LLC, Apr. 2004, 9 Pages, [Retrieved on Jul. 23, 2019], Retrieved From URL: https://www.spcforexcel.com/knowledge/control-charts-basics/interpreting-control-charts.
Szkilnyk G., "Vision Based Fault Detection In Assembly Automation," Queen's University, Jun. 2012, 219 Pages.
Thrun, "Probabilistic robotics," Communications of the ACM 45.3, 2002, pp. 52-57.
Zhou C., et al, "Anomaly Detection with Robust Deep Autoencoders," Proceedings of the 23rd ACM SIGKDD International Conference on Knowledge Discovery and Data Mining, Aug. 13-17, 2017, pp. 665-674.
Vecerik M., et al, "Leveraging Demonstrations for Deep Reinforcement Learning on Robotics Problems with Sparse Rewards," arXiv preprint, arXiv:1707.08817, Submitted on Jul. 27, 2017, 10 Pages, Last revised on Oct. 8, 2018.
Zhong R.Y., et al, "Intelligent Manufacturing In The Context of Industry 4.0: A Review," Engineering, Mar. 31, 2017, vol. 3, No. 5, pp. 616-630.
American Society for Quality: "What is Statistical Process Control?," 2021, 07 Pages, [Retrieved on Jul. 23, 2019], Retrieved from URL: https://asq.org/quality-resources/statistical-process-control.
An J., et al, "Variational Autoencoder Based Anomaly Detection Using Reconstruction Probability," Special Lecture on IE 2.1,Dec. 27, 2015, pp. 1-18.
Bose A., et al., "Behavioral Detection of Malware on Mobile Handsets," MobiSys, Proceedings of the 6th International Conference on Mobile Systems, Applications, and Services, Jun. 17-20, 2008, pp. 225-238.
Evangelidis G.D., et al, "Parametric Image Alignment Using Enhanced Correlation Coefficient Maximization," IEEE Transactions on Pattern Analysis and Machine Intelligence, Oct. 2008, vol. 30, No. 10, pp. 1-8.
Extended European Search Report for European Application No. 19916905.3, dated Sep. 9, 2022, 10 Pages.
Extended European Search Report for European Application No. 20156940.7, dated Aug. 10, 2020, 12 Pages.
Extended European Search Report for European Application No. 20763956.8, dated Sep. 9, 2022, 11 Pages.
Extended European Search Report for European Application No. 20832713.0, dated Jan. 3, 2023, 10 Pages.
Fujimoto S., et al., "Addressing Function Approximation Error In Actor-critic Methods," Proceedings of the 35th International Conference on Machine Learning Research, Oct. 22, 2018, 15 Pages.
Goodfellow I.J., et al., "Generative Adversarial Nets," Proceedings of Advances in Neural Information Processing Systems, 2014, 9 Pages.
International Preliminary Report on Patentability for International Application No. PCT/US2019/053746, dated Sep. 10, 2021, 6 Pages.
International Preliminary Report on Patentability for International Application No. PCT/US2020/029022, dated Sep. 10, 2021, 6 Pages.
International Preliminary Report on Patentability for International Application No. PCT/US2020/039064, dated Jan. 6, 2022, 7 Pages.
International Preliminary Report on Patentability for International Application No. PCT/US2020/052254, dated Apr. 21, 2022, 7 Pages.
International Preliminary Report on Patentability for International Application No. PCT/US2020/059339, dated May 19, 2022, 13 Pages.
International Preliminary Report on Patentability for International Application No. PCT/US2020/061434, dated Jun. 2, 2022, 09 Pages.
International Preliminary Report on Patentability for International Application No. PCT/US2021/019857, dated Sep. 9, 2022, 14 Pages.
International Preliminary Report on Patentability for International Application No. PCT/US2021/021440, dated Sep. 22, 2022, 09 Pages.
International Search Report and Written Opinion for International Application No. PCT/US2019/053746, dated Nov. 5, 2019, 7 Pages.
International Search Report and Written Opinion for International Application No. PCT/US2020/029022, dated Jul. 9, 2020, 08 Pages.
International Search Report and Written Opinion for International Application No. PCT/US2020/039064, dated Jul. 30, 2020, 8 Pages.
International Search Report and Written Opinion for International Application No. PCT/US2020/052254, dated Jan. 12, 2021, 8 Pages.
International Search Report and Written Opinion for International Application No. PCT/US2020/059339, dated Feb. 5, 2021, 14 Pages.
International Search Report and Written Opinion for International Application No. PCT/US2020/061434, dated Feb. 22, 2021, 10 Pages.
International Search Report and Written Opinion for International Application No. PCT/US2021/019857, dated May 7, 2021, 15 Pages.
International Search Report and Written Opinion for International Application No. PCT/US2021/038085, dated Sep. 29, 2021, 14 Pages.
Karnouskos S., "Stuxnet Worm Impact on Industrial Cyber-Physical System Security," IECON, 37th Annual Conference of the IEEE Industrial Electronics Society, IEEE, 2011,5 Pages.
Kingma D.P., et al, "Adam: A Method for Stochastic Optimization," arXiv preprint arXiv:1412.6980, ICLR 2015, Jan. 30, 2017, 15 pages.
Lardinois F., "Nvidia's Researchers Teach a Robot to Perform Simple Tasks by Observing a Human," 6 Pages, [Retrieved on Mar. 11, 2019], Retrieved from URL: https://techcrunch.com/2018/05/20/nvidias-researchers-teach-a-robot-to-learn-simple-tasks-by-observing-a-human/?utm_source=tcfbpage&utm_medium=feed&utm_campaign=Feed%3A+Techcrunch+%28TechCrunch%29&sr_share=facebook.
Lillicrap T.P., et al, Continuous Control With Deep Reinforcement Learning, Published as a Conference Paper at ICLR 2016, arXiv: 1509.02971v6 [cs.LG], Last Revised on Jul. 5, 2019, 14 Pages.
Liu H., et al., "Intelligent Tuning Method of Pid Parameters Based on Iterative Learning Control for Atomic Force Microscopy," Science Direct Micron, 2018, vol. 104, pp. 26-36.
Malhotra P., et al., "LSTM-Based Encoder-Decoder for Multi-Sensor Anomaly Detection," arXiv preprint arXiv: 1607.00148, Last Revised on Jul. 11, 2016, 5 pages.
Mnih V., et al, "Playing Atari With Deep Reinforcement Learning," arXiv preprint arXiv: 1312.5602v1, Dec. 19, 2013, 9 pages.
Mueller F., et al., "Real-time Hand Tracking under Occlusion from an Egocentric RGB-D Sensor," Max-Planck-Institute for Informatics, Germany, Universidad Rey Juan Carlos, Spain, Oct. 5, 2017, 16 Pages.
Ng A., "Sparse Autoencoder," CS294A Lecture Notes 72.2011,2011, pp. 1-19.
Office Action and Search Report from Taiwan Patent Application No. 108137373, dated Mar. 31, 2023, 24 pages.
Office Action and Search Report from Taiwan Patent Application No. 111130991, dated May 17, 2023, 19 pages.
Office Action and Search Report from Taiwan Patent Application No. 112103333, dated Aug. 21, 2023, 8 Pages.
Office Action for Chinese Patent Application No. 2020800738527, dated Apr. 25, 2023, 37 Pages.
Office Action for European Patent Application No. 20156940.7, dated Feb. 10, 2023, 6 Pages.
Office Action for Japanese Patent Application No. 2021-549835, dated Mar. 3, 2023, 7 Pages.
Office Action for Japanese Patent Application No. 2021575060, dated Jun. 2, 2023, 7 pages.
Office Action for Japanese Patent Application No. 2022520885, dated Jun. 30, 2023, 10 Pages.

(56) References Cited

OTHER PUBLICATIONS

Office Action for Japanese Patent Application No. 2022529027, dated Jun. 30, 2023, 5 pages.
Papanastasiou S., et al., "Bridging the Gap between Physical Layer Emulation and Network Simulation," IEEE Wireless Communication and Networking Conference, Date of Conference: Apr. 18-21, 2010, 06 pages.
Purdue University: "Intrusion Alert: System Uses Machine Learning, Curiosity-Driven 'Honeypots' to Stop Cyber Attackers," Research Foundation News, Feb. 6, 2020, 06 Pages, Retrieved From URL: https://engineering.purdue.edu/ECE/News/2020/intrusion-alert-system-uses-machine-learning-curiosity-driven-honeypots-to-stop-cyber-attackers.
Real R., et al., "The Probabilistic Basis of Jaccard's Index of Similarity," Systematic Biology, 1996, vol. 45, No. 3, pp. 380-385.
Sakurada M., et al., "Anomaly Detection Using Autoencoders With Nonlinear Dimensionality Reduction," Proceedings of the Machine Learning for Sensory Data Analysis (MLSDA) 2nd Workshop on Machine Learning for Sensory Data Analysis, 2014, 8 Pages.
Saunders J.A., et al., "Visual Feedback Control of Hand Movements," The Journal of Neuroscience, Mar. 31, 2004, vol. 24, No. 13, pp. 3223-3234.
Simon T., et al., "Hand Keypoint Detection in Single Images Using Multiview Bootstrapping," Proceedings of the IEEE conference on Computer Vision and Pattern Recognition, 2017, pp. 1145-1153.
Office Action for Japanese Patent Application No. 2021549835, dated Sep. 22, 2023, 7 pages.
Notice of Allowance for Taiwanese Patent Application No. 108137373, mailed Oct. 12, 2023, 4 pages.
Office Action for Chinese Patent Application No. 202080073852.7, mailed Nov. 1, 2023, 4 pages.
Office Action for Japanese Patent Application No. 2022-520885, mailed Nov. 2, 2023, 5 pages.
Office Action for Japanese Patent Application No. 2022-551360, mailed Nov. 2, 2023, 4 pages.
Office Action for Japanese Patent Application No. 2022-207136, mailed Nov. 24, 2023, 6 pages.
Office Action for TW Patent Application No. 11221179860, mailed Nov. 27, 2023, 10 pages.
Office Action from Taiwan Patent Application No. 11221224400, dated Dec. 6, 2023, 18 pages.
Office Action from Indian Patent Application No. 202217044168, dated Nov. 30, 2023, 10 pages.
Extended Search Report from European Patent Application No. 20874557.0, dated Oct. 19, 2023, 12 Pages.
Potluri, et al., "Deep learning based efficient anomaly detection for securing process control systems against injection attacks," 2019 IEEE 15th International Conference on Automation Science and Engineering (CASE), 2019, pp. 854-860.
Erba, et al., "Real-time evasion attacks with physical constraints on deep learning-based anomaly detectors in industrial control systems," arXiv preprint arXiv:1907.07487, 2019, 15 pages.
Notification of Reason for Refusal from Korean Patent Application No. 10-2021-7030695, dated Dec. 18, 2023, 13 Pages.
Notice of Allowance for Japanese Patent Application No. 2021-549835, mailed Jan. 5, 2024, 3 Page.
Office Action for Japanese Patent Application No. 2022577143, mailed Jan. 12, 2024, 7 pages.
Office Action for Chinese Patent Application No. 202080044987.0, mailed Jan. 29, 2024, 7 pages.
Office Action for Chinese Patent Application No. 202080016336.0, mailed Feb. 1, 2024, 8 pages.
Extended European Search Report for European Application No. 20885424.0 dated Jan. 5, 2024, 12 pages.
Extended European Search Report for European Application No. 20889594.6 dated Nov. 27, 2023, 87 pages.
Notice of Allowance from Japanese Patent Application No. 2022-551360, dated Feb. 16, 2024, 3 pages.
Office Action for Japanese Patent Application No. 2022-553668, mailed Feb. 9, 2024, 9 pages.
Office Action for Chinese Patent Application No. 201980092196.2, dated Feb. 29, 2024, 12 pages.
Notice of Allowance for Korean Patent Application No. 10-2021-7039615, mailed Feb. 27, 2024, 8 pages.
Tang, et al., "HonIDS: Enchancing honeypot system with intrustion detection models," Fourth IEEE International Workshop on Information Assurance (IWIA'06), IEEE, 2006.
Notice of Allowance for TW Patent Application No. 111130991, mailed Mar. 4, 2024, 4 pages.
Notice of Allowance for JP Patent Application No. 2022-520885, mailed Mar. 29, 2024, 3 pages.
Office Action for KR Patent Application No. 10-2021-7030700, dated Mar. 19, 2024, 16 pages.
Office Action from Chinese Patent Application No. 202080073852.7, dated Apr. 19, 2024, 15 pages.
Office Action from Chinese Patent Application No. 202180014828.0, dated Apr. 28, 2024, 8 pages.
Office Action from TW Patent Application No. 112103333, dated May 2, 2024, 3 pages.
Notice of Allowance from Taiwan Patent Application No. 112113077, dated May 14, 2024, 6 pages.
Office Action for European Patent Application No. 21767468.8, mailed Mar. 22, 2024, 12 Pages.
Office Action from Taiwan Patent Application No. 111108232, dated May 30, 2024, 8 pages.
Notice of Allowance from Japan Patent Application No. 2022-577143, dated May 31, 2024, 2 pages.
Office Action from Chinese Patent Application No. 202080079163.7, dated Jun. 4, 2024, 10 pages.
Office Action from India Patent Application No. 202318013498, dated May 31, 2024, 7 pages.
Office Action for Japanese Patent Application No. 2023-116653, mailed Jul. 12, 2024, 6 pages.
Notice of Allowance for TW Patent Application No. 10921636, mailed Jul. 9, 2024, 4 pages.
Office Action for Japanese Patent Application No. 2022-207136, mailed Jul. 26, 2024, 6 pages.
Office Action for Korean Patent Application No. 10-2022-7032975, mailed Jul. 20, 2024, 16 pages.
Office Action for Korean Patent Application No. 10-2021-7030695, mailed Jul. 12, 2024, 6 pages.
Office Action for Japanese Patent Application No. 2023-192266, mailed Aug. 9, 2024, 9 pages.
Notice of Allowance for Chinese Patent Application No. 202080044987.0, mailed Aug. 20, 2024, 4 pages.
Office Action for EP Patent Application No. 19916905.3, mailed May 28, 2024, 7 pages.
Office Action for EP Patent Application No. 20763956.8, mailed May 28, 2024, 7 pages.

* cited by examiner

SYSTEMS, METHODS, AND MEDIA FOR MANUFACTURING PROCESSES

CROSS-REFERENCE TO RELATED APPLICATIONS

This application claims priority to U.S. Provisional Application Ser. No. 62/986,987 filed Mar. 9, 2020, which is hereby incorporated by reference in its entirety. This application is a continuation-in-part of U.S. application Ser. No. 17/091,393, filed Nov. 6, 2020, which claims priority to U.S. Provisional Application Ser. No. 62/931,448, filed Nov. 6, 2019, U.S. Provisional Application Ser. No. 62/932,063, filed Nov. 7, 2019, and U.S. Provisional Application Ser. No. 62/931,453, filed Nov. 6, 2019, which are hereby incorporated by reference in their entireties.

FIELD OF DISCLOSURE

The present disclosure generally relates to a system, method, and media for manufacturing processes.

BACKGROUND

Since the dawn of the industrial revolution in the $18^{th}$ century, automation has governed the production of goods. Although today's factories have fully embraced automation as a core principle—with robots performing many repeatable tasks in high-production environments—many assembly tasks continue to be performed by humans. These tasks are difficult to automate due to cost, risk of critical failure, or logistics of deploying a robotic system for a low-quantity production run. These production lines are overseen by standard process control and people management, such that an assembler is taught to perform a certain quality metric over time, or they are replaced by another operator. This process has remained largely unchanged since the advent of the assembly.

SUMMARY

In some embodiments, a manufacturing system is disclosed herein. The manufacturing system includes one or more stations, a monitoring platform, and a control module. Each station is configured to perform at least one step in a multi-step manufacturing process for a component. The monitoring platform configured to monitor progression of the component throughout the multi-step manufacturing process. T control module configured to dynamically adjust processing parameters of a step of the multi-step manufacturing process to achieve a desired final quality metric for the component, the control module configured to perform operations. The operations include receiving image data of tooling of a first station of the one or more stations. The operations further include identifying a set of keypoints from the image data. The keypoints correspond to position information of the tooling during processing at the first station. The operations further include determining, by a machine learning model, a final quality metric for the component, based on the keypoints. The operations further include, based on the determining, assigning the component to a class of components based on a comparison between the final quality metric generated by the machine learning model and a canonical final quality metric for the component.

In some embodiments, a computer-implemented method for controlling a multi-step manufacturing process is disclosed herein. The multi-step manufacturing process involves one or more stations of a manufacturing system. Each station is configured to perform at least one step in a multi-step manufacturing process for a component. A computing system associated with the manufacturing system receives image data of tooling of a first station of the one or more stations. The computing system identifies a set of keypoints from the image data, the set of keypoints corresponding to position information of the tooling during processing at the first station. A machine learning model associated with the computing system determines a final quality metric for the component, based on the set of keypoints. Based on the determining, the computing system assigns the component to a class of components based on a comparison between the final quality metric generated by the machine learning model and a canonical final quality metric for the component.

In some embodiments, a manufacturing system is disclosed herein. The manufacturing system includes one or more stations, a monitoring platform, and a control module. Each station is configured to perform at least one step in a multi-step manufacturing process for a component. The monitoring platform configured to monitor progression of the component throughout the multi-step manufacturing process. T control module configured to dynamically adjust processing parameters of a step of the multi-step manufacturing process to achieve a desired final quality metric for the component, the control module configured to perform operations. The operations include receiving image data of tooling of a first station of the one or more stations. The operations further include identifying a set of keypoints from the image data. The keypoints correspond to position information of the tooling during processing at the first station. The operations further include determining, by a machine learning model, a final quality metric for the component, based on the keypoints. The operations further include determining that the final quality metric is not within a threshold tolerance from the final quality metric. The operations further include based on the determining, assigning the component to a class of components based on a comparison between the final quality metric generated by the machine learning model and a canonical final quality metric for the component. The operations further include, based on the assigning, determining that the class assigned to the component is not an acceptable class. The operations further include based on the determining, inferring positional information corresponding to the component at the first processing station. The operations further include based on the determining, generating an updated instruction set to be performed by a downstream station. The operations further include predicting, by a machine learning model, a final quality metric for the component based on the updated instruction set. The operations further include, based on the predicted final quality metric, providing the updated instruction set to the downstream station.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
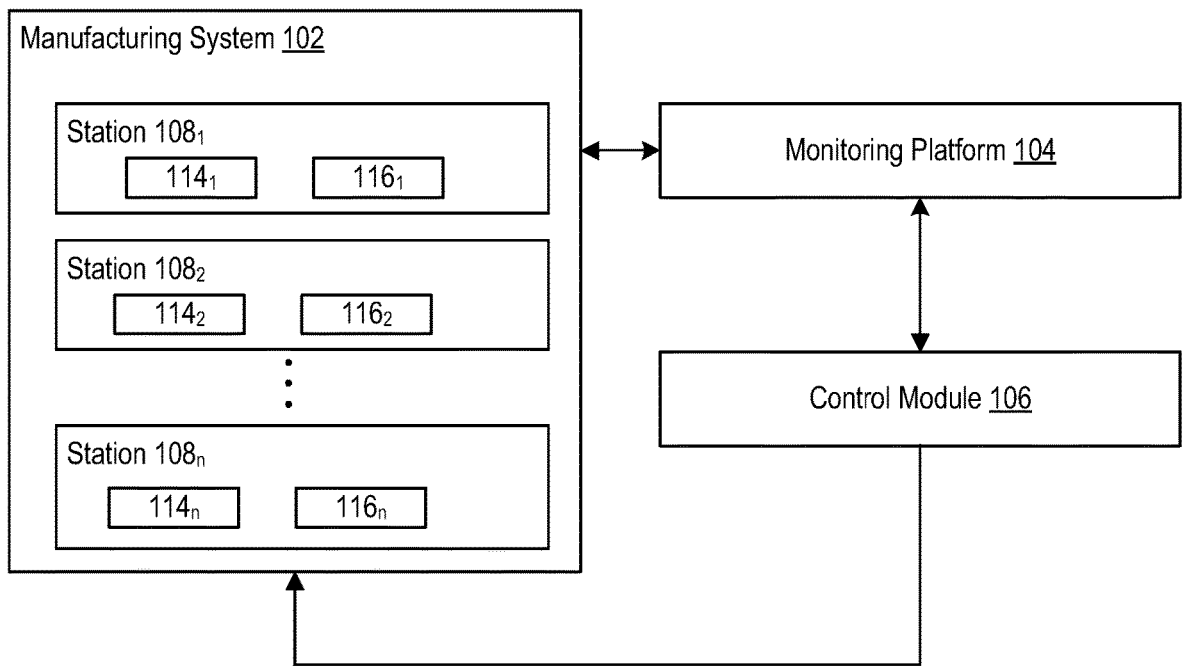
FIG. 1 is a block diagram illustrating a manufacturing environment, according to example embodiments.

Manufacturing processes may be complex and include raw materials being processed by different process stations (or "stations") until a final component is produced. In some embodiments, each process station receives an input for processing and may output an intermediate output that may be passed along to a subsequent (downstream) process station for additional processing. In some embodiments, a final process station may receive an input for processing and may output the final component or, more generally, the final output.

In some embodiments, each station may include one or more tools/equipment that may perform a set of process steps. Exemplary process stations may include, but are not limited to, conveyor belts, injection molding presses, cutting machines, die stamping machines, extruders, computer numerical control (CNC) mills, grinders, assembly stations, three-dimensional printers, quality control stations, validation stations, and the like.

In some embodiments, operations of each process station may be governed by one or more process controllers. In some embodiments, each process station may include one or more process controllers that may be programmed to control the operation of the process station. In some embodiments, an operator, or control algorithms, may provide the station controller with station controller setpoints that may represent the desired value, or range of values, for each control value. In some embodiments, values used for feedback or feed forward in a manufacturing process may be referred to as control values. Exemplary control values may include, but are not limited to: speed, temperature, pressure, vacuum, rotation, current, voltage, power, viscosity, materials/resources used at the station, throughput rate, outage time, noxious fumes, and the like.

One or more techniques provided herein improves upon conventional processes by providing a system through which image and/or video data may be used to predict or forecast a final quality metric of a component. In some embodiments, the system may include a monitoring system configured to capture or record video and/or image data of the tooling of each processing node or station of manufacturing system. Based on the positioning of the tooling during a process step, the present system may be configured to predict or forecast a final quality metric of a component. If the predicted final quality metric falls outside of a range of acceptable values, the present system may generate and provide updated processing instructions to downstream processing nodes and/or stations, in an attempt to correct for any errors in processing, such that a desired final quality metric may be achieved.

In some embodiments, the system may include a monitoring system configured to capture or record video and/or image data of a component at each processing node or station of the manufacturing system. Based on visual information about the component at an end of a processing node, the present system may be configured to predict or forecast a final quality metric of a component. If the predicted final quality metric falls outside of a range of acceptable values, the present system may generate and provide updated processing instructions to downstream processing nodes and/or stations, in an attempt to correct for any errors in processing, such that a desired final quality metric may be achieved.

In this manner, the present system is able to predict or forecast a final quality metric of a component, at any stage of the manufacturing process, without having to actually test the component. Such system is particularly useful for final quality metrics that would otherwise require destructive testing, or for which the final quality metric cannot be evaluated until processing is complete.

FIG. 1 is a block diagram illustrating a manufacturing environment 100, according to example embodiments. Manufacturing environment 100 may include a manufacturing system 102, a monitoring platform 104, and a control module 106. Manufacturing system 102 may be broadly representative of a multi-step manufacturing system. In some embodiments, manufacturing system 102 may be representative of an assembly line system, where each processing station may be representative of a human worker. In some embodiments, manufacturing system 102 may be representative of a manufacturing system for use in additive manufacturing (e.g., 3D printing system). In some embodiments, manufacturing system 102 may be representative of a manufacturing system for use in subtractive manufacturing (e.g., CNC machining. In some embodiments, manufacturing system 102 may be representative of a manufacturing system for use in a combination of additive manufacturing and subtractive manufacturing. More generally, in some embodiments, manufacturing system 102 may be representative of a manufacturing system for use in a general manufacturing process.

Manufacturing system 102 may include one or more stations 108$_1$-108$_n$ (generally, "station 108"). Each station 108 may be representative of a step and/or station in a multi-step manufacturing process. For example, each station 108 may be representative of a layer deposition operation in a 3D printing process (e.g., station 108$_1$ may correspond to layer 1, station 108$_2$ may correspond to layer 2, etc.). In another example, each station 108 may correspond to a specific processing station. In another example, each station 108 may correspond to a specific human operator performing a specific task in an assembly line manufacturing process.

Each station 108 may include a process controller 114 and control logic 116. Each process controller $114_1$-$114_n$ may be programmed to control the operation of each respective station 108. In some embodiments, control module 106 may provide each process controller 114 with station controller setpoints that may represent the desired value, or range of values, for each control value. Control logic 116 may refer to the attributes/parameters associated with a station's 108 process steps. In operation, control logic 116 for each station 108 may be dynamically updated throughout the manufacturing process by control module 106, depending on a current trajectory of a final quality metric.

Monitoring platform 104 may be configured to monitor each station 108 of manufacturing system 102. In some embodiments, monitoring platform 104 may be a component of manufacturing system 102. For example, monitoring platform 104 may be a component of a 3D printing system. In some embodiments, monitoring platform 104 may be independent of manufacturing system 102. For example, monitoring platform 104 may be retrofit onto an existing manufacturing system 102. In some embodiments, monitoring platform 104 may be representative of an imaging device configured to capture an image of a component or tooling (e.g., a worker or a process tool) at each step of a multi-step process. For example, monitoring platform 104 may be configured to capture an image of the component at each station 108 and/or an image of a component developing the component at each station 108 (e.g., tooling, human, etc.). Generally, monitoring platform 104 may be configured to capture information associated with production of a component (e.g., an image, a voltage reading, a speed reading, etc.) and/or tool (e.g., hand position, tooling position, etc.), and provide that information, as input, to control module 106 for evaluation.

Control module 106 may be in communication with manufacturing system 102 and monitoring platform 104 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN.

Control module 106 may be configured to control each process controller of manufacturing system 102. For example, based on information captured by monitoring platform 104, control module 106 may be configured to adjust process controls associated with a specific station 108. In some embodiments, control module 106 may be configured to adjust process controls of a specific station 108 based on a projected final quality metric.

Figure 2:
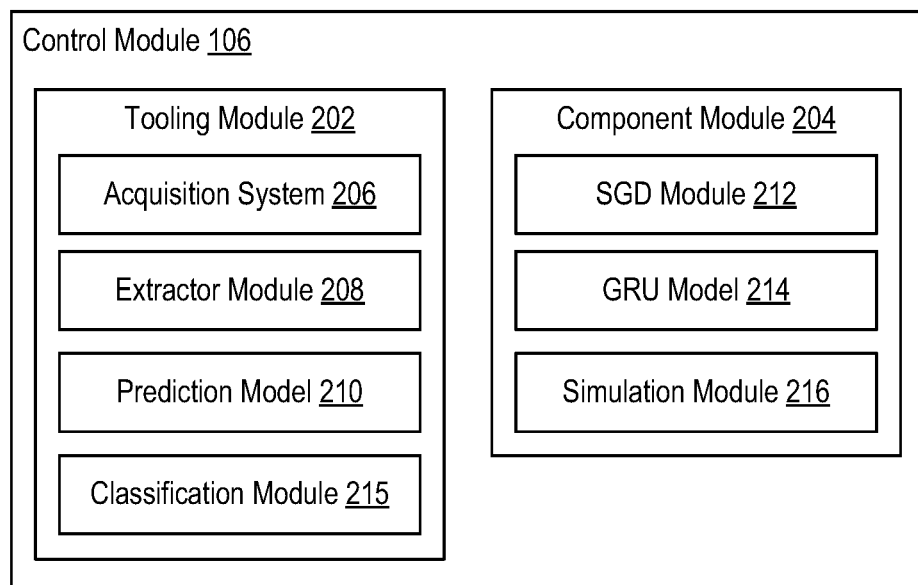
FIG. 2 is a block diagram illustrating control module, according to exemplary embodiments.

FIG. 2 is a block diagram illustrating control module 106, according to exemplary embodiments. Control module 106 may include a tooling module 202 and a component module 204.

Tooling module 202 may be configured to project a final quality metric of a specimen at a given stage of production based on image data obtained by monitoring platform 104. In operation, control module 106 may receive input from monitoring platform 104. In some embodiments, such input may take the form of an image or video of the tooling performing a subprocess at a given step of the multi-step manufacturing process. For example, the image or video data may include image or video data of a human's hands while performing a specific subprocess of the multi-step manufacturing process. In another example, the image or video data may include image or video data of a three-dimensional printer performing depositing a specific layer of a multi-layer manufacturing process. Based on the input, control module 106 may project a final quality metric of the component. Depending on the projected final quality metric of the component, control module 106 may determine one or more actions to take in subsequent manufacturing steps in order to reach a desired or threshold final quality metric. For example, if the projected final quality metric falls outside of a range of acceptable values, control module 106 may take one or more actions to rectify the manufacturing process. In some embodiments, control module 106 may interface with station controllers in subsequent stations 108 to adjust their respective control and/or station parameters. In some embodiments, control module 106 may provide human manufacturers with updated instructions to be performed at each downstream processing station of a production line. These adjustments may aid in correcting the manufacturing process, such that the final quality metric may be within the range of acceptable quality metrics.

Component module 204 may be configured to project a final quality metric of a specimen at a given stage of production based on image data obtained by monitoring platform 104. In some embodiments, component module 204 may receive input from monitoring platform 104. In some embodiments, such input may take the form of an image or video of the component at a given step of the multi-step manufacturing process. In some embodiments, component module 204 may receive inferred component data at a given step of the multi-step manufacturing process from tooling module 202. For example, tooling module 202 may infer information about the component at a given step of the multi-step manufacturing process based on the tooling image or video data and provide that inferred information to component module 204 as input. Based on the input, component module 204 may project a final quality metric of the component. Depending on the projected final quality metric of the component, component module 204 may determine one or more actions to take in subsequent manufacturing steps in order to reach a desired or threshold final quality metric. For example, if the projected final quality metric falls outside of a range of acceptable values, component module 204 may identify one or more actions to rectify the manufacturing process. In some embodiments, control module 106 may interface with station controllers in subsequent stations 108 to adjust their respective control and/or station parameters. In some embodiments, control module 106 may provide human manufacturers with updated instructions to be performed at each downstream processing station of a production line. These adjustments may aid in correcting the manufacturing process, such that the final quality metric may be within the range of acceptable quality metrics.

Each of tooling module 202 and component module 204 may include one or more software modules. The one or more software modules may be collections of code or instructions stored on a media (e.g., memory of computing systems associated with control module 106) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions. Further, in some embodiments, each of tooling module 202 and component module 204 may be configured to transmit one or more signals among the components. In such embodiments, such signals may not be limited to machine instructions executed by a computing device.

In some embodiments, tooling module 202 and component module 204 may communicate via one or more local networks. Network may be of any suitable type, including individual connections via the Internet, such as cellular or Wi-Fi networks. In some embodiments, network may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Tooling module 202 may include acquisition system 206, extractor module 208, and prediction module 210. Generally, a multi-node or multi-station assembly environment, such as manufacturing system 102, may be represented, broadly as $G(\vec{s}_i\ \vec{a}_i)$, where $\vec{s}_i$ may represent the states of the component at all i nodes and where $\vec{a}_i$ may represent that set of actions to be performed on the component by the tooling at all i nodes. Given a norm or canonical quality measurement, $V_c$, tooling module 202 may be configured to optimize the error in the assembly process with an estimated quality metric, $\hat{V}_c$, such that $\hat{V}_c$ may be within a threshold distance of $V_c$. In some embodiments, tooling module 202 may estimate the state, $\vec{s} = [s_0, s_1, \ldots, s_{N-1}]$, which may be a numerical representation of a state of the component at all N nodes, and the actions, $\vec{a} = [\alpha_0, \alpha_1, \ldots, \alpha_{N-1}]$, which may represent the instructions or control values at each node.

Acquisition system 206 may be configured to receive image data of the assembly process at each node, N. In some embodiments, acquisition system 206 may receive the image data of the assembly process of monitoring platform 104. In some embodiments, for each node N, acquisition system 206 may receive V number of images, where V may represent the number of cameras of monitoring platform 104 that may record the assembly procedure at each node. Accordingly, each image of the V number of images may capture a different perspective of the component during processing. Following receipt of the image data, acquisition system 206 may be configured to extract a subset of images of frames. For example, acquisition system 206 may be configured to extract L number of images from the received image data. The extracted images may be referred to as landmark frames. Landmark frames may be those image frames that are in high motion. The extracted images may include those images or frames that include certain landmarks, $\vec{l}$, of the component, where $\vec{l} = \vec{s} = [i_0, i_1, \ldots, i_{N-1}]$, and may represent the entire manufacturing process for the component.

Both minimal-motion (e.g., "landmark") frames and maximal-motion (e.g., "high motion") frames for a given operator may contain useful information for a classifier that is trying to correlate finger-hand-arm data and flight performance data in a robust way across a number of operators. In some embodiments, an optical flow algorithm may be used to measure an amount of motion in any given frame. Acquisition system 206 may select those frames that contain the most motion.

Extractor module 208 may be configured to extract keypoints from the L number of images. For example, extractor module 208 may be configured to extract K number of keypoints, i.e., (x, y) pairs, per landmark $I_i$. In other words, extractor module 208 may be configured to output K number of keypoints for a given input, $I_i \in \mathbb{R}^{w \times h}$, where $l \in [0, L-1]$. As output, extractor module 208 may generate a single vector $\vec{p} = [\vec{p}_0, \vec{p}_1, \ldots, \vec{p}_{L-1}]$. This vector may include landmark representations of K number of (x, y) pairs which may be represented by $\vec{p}_i = [(x_0, y_0), (x_1, y_1), \ldots (x_{K-1}, y_{K-1})]$, where $i \in [0, L-1]$.

In some embodiments, to generate the $\vec{p}$, extractor module 208 may implement two separate algorithms: (1) a bounding box estimation; and (2) keypoint detection.

With respect to the bounding box estimation, given $\vec{l}$ each landmark frame may be processed with a threshold image segmentation to generate a mask image for each tooling component. For example, in an embodiment in which the tooling is a human, extractor module 208 may generate a mask image for each of the user's hands. In some embodiments, extractor module 208 may implement blob detection to locate components of the tooling. Using a human as an example, extractor module 208 may assume that the image always contains both the left and right hands of the user. When a frame fails to include both hands, extractor module 208 may assign the value with an arbitrary constant value, c.

With respect to keypoint detection, extractor module 208 may identify keypoints of the tooling based on the estimated bounding boxes. For example, with given input, extractor module 208 may estimate K number of points, $\vec{p}_i$, along with its confidence value, $\vec{c}_i$. In some embodiments, extractor module 208 may estimate, not only the points that are visible on the frame, but also points that may be occluded from the frame due to one or more of articulation, viewpoints, objects, or tool interactions. Because the objective may be to predict the quality measurement using the tracked keypoints, the non-estimated occluded points may be unique and important features representing the assembly process. Therefore, an occlusion threshold value, $t_o$, may be derived from observation of $c_i$ value on occluded points in small randomly chosen subset of the landmark frames. Using $t_o$, extractor module 208 may filter out the estimation that are $c_o < t_o$. For those filtered points, extractor module 208 may assign them an arbitrary constant value, c. Regardless of the visibility of the tooling or keypoints on the frame, the output of extractor module 208 may include L*K(x, y) pairs for each component.

In other words, extractor module 208 may be configured to assign a default basal level of confidence for occluded components and, therefore, estimate those keypoints so that a full set of keypoints may be available to measure discrepancies between observed trial tooling component positions and the canonical tooling component positions. In some embodiments, tooling module 202 may draw inferences about the state of the component at a given point in time (e.g., station i) and then output recommended modified-from-canonical subsequent actions to take to correct for the measured discrepancies.

Prediction module 210 may be configured to predict a final quality metric, $\hat{V}_c$. For example, prediction module 210 may be configured to predict a final quality metric, $\hat{V}_c$, where $\hat{V}_c \in \mathbb{R}^1$, given tooling tracking information for the L number of points-in-time, $\vec{p}$, where $\vec{p} \in \mathbb{R}^{K*L}$ may be gathered from each processing station 108. In some embodiments, prediction module 210 may implement a long short-term memory (LSTM) model to output the final quality metric. The LSTM model may allow prediction module 210 to overcome a vanishing gradient problem that is common in conventional recurrent neural networks. The vanishing gradient problem is the case where a model fails to relate the early weights of the neural network when the magnitude of the gradients are small for later layers. LSTM model eliminates this issue.

In some embodiments, tooling module 202 may further include a classification module 215. Classification module 215 may be configured to classify a specimen into one or more classes based on the predicted final quality metric, $\hat{V}_c$. For example, in operation, classification module 215 may receive a canonical or desired final quality metric, $V_c$, for the specimen. Classification module 215 may be configured to compare the predicted final quality metric, $V_c$, to the canonical or desired final quality metric, $V_c$, to generate a delta, $\Delta_V$. Depending on the value of $\Delta_V$, classification module 215 may sort the specimen into one or more classes. For example, assume that classification module 215 may sort the specimen into one of four classes: fail (class 1), fair (class 2), excellent (class 3), and over-qualify (class 4). Classification module 215 may sort the specimen based on associated class definitions. For example, the associated definitions may be:

Class 1: Fail: $\hat{V}_c < \frac{V_c}{3}$

Class 2: Fair: $\frac{V_c}{3} \leq V_c < \frac{2V_c}{3}$

Class 3: Excellent: $\frac{2V_c}{3} \leq \hat{V}_c \leq V_c$

Class 4: Over Qualify: $V_c < \hat{V}_c$

As those skilled in the art recognize, the associated definitions may change based on operator or client preference.

In some embodiments, control module 106 may use the classification assigned to the component to determine whether the final quality metric is acceptable. For example, an operator or client may specify that components classified in Class 1 are not acceptable, while components classified in any of Classes 2-4 are acceptable. In another example, an operator or client may specify that components classified in Class 1 or Class 2 are not acceptable, while components classified in Class 3 or Class 4 are acceptable.

Figure 3:
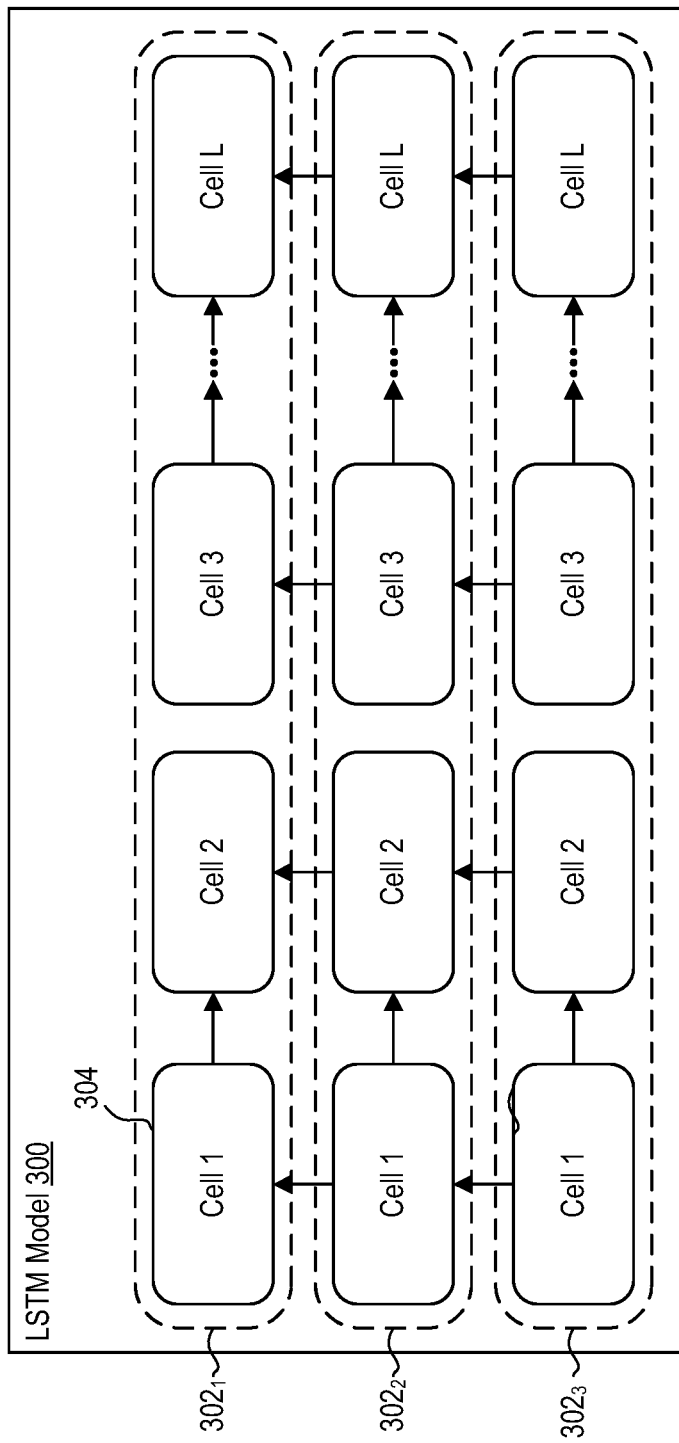
FIG. 3 is a block diagram illustrating an exemplary architecture of LSTM model, according to example embodiments.

FIG. 3 is a block diagram illustrating an exemplary architecture of LSTM model, according to example embodiments. As shown, LSTM model 300 may include three layers $302_1$-$302_3$ (generally layer 302). As shown, each layer 302 may include one or more cells 304. In some embodiment, each cell's 304 input may be $p_i$, where $i \in [0, L-1]$. Each cell in the LSTM may be defined as:

$f_i = \sigma(W_f * [h_{i-1}, p_i] + b_f)$ eq. 1:

$I\_i = \sigma(W\_I * [h\_(i-1), p\_i] + b\_I)$ eq. 2:

$c_i = f_i * c_{t-1} + I_i * \tanh(W_c * [h_{i-1}, p_i] + b_c)$ eq. 3:

$o_i = \sigma(W_o * [h_{i-1}, p_i] + b_o)$ eq. 4:

$h_i = o_i * \tanh c_i$ eq. 5:

where equation 1 decides whether to keep information from the previous cell or not; equation (2) decides which values to update; equation (3) updates the cell; and equation (4) decides which part to output. Equation (5) may filter the output parts so that LSTM model 300 only outputs what it is programmed to output.

In some embodiments, LSTM model 300 may include three layers 302 with 30 hidden sizes. In some embodiments, LSTM model 300 may be a sequence-to-one LSTM model. For training, the L1, mean absolute error (MAE), loss function:

$$\mathcal{L}(\vec{y}, \vec{\hat{y}}) = \frac{\sum_{b=1}^{B} |y_b - \hat{y}_b|}{B}$$

may be minimized using an Adam optimizer. In some embodiments, MAE may be used because the goal may be to minimize or reduce the magnitude of errors, regardless of the direction of the error.

Referring back to FIG. 2, prediction module 210 may be trained using a canonical set of instructions, $\vec{a}$, and multiple components, M. For example, using 10 node videos of M number of data, the input for prediction module 210 may be structured by first being pre-processed through acquisition system 206 and extractor module 208. In some embodiments, each component involved in training may be validated through a validation algorithm that checks their composition (e.g., shape). In some embodiments, the validation algorithm may compute a similarity index on the composition at the end of each node by comparing the composition with canonical compositions. As a result, the components for training are roughly similar to the canonical composition.

In some embodiments, for output, the corresponding physical components may be tested in a controlled environment to measure their quality metric. Using the prepared input data with corresponding output data, prediction module 210 may be trained, for example, with a portion of M being training data and another portion of M being validation data. Once trained, prediction module 210 may be able to predict a quality measurement of a component at a given processing step, based on image data of the tooling.

Now referring to component module 204, component module 204 may include stochastic gradient descent (SGD) module 212, gated recurrent unit (GRU) model 214, and simulation module 216. For purposes of this discussion, a partial construct of a component may be defined as $\hat{a}_k$, where step k introduces an irreversible error in the manufacturing process, and steps k+1, ..., N are not yet defined. Component module 204 may be configured to identify an optimal corrective sequence of remaining actions [$\{r_{k+1}, t_{k+1}\}, ..., \{r_N, t_N\}$], where r and t may correspond to specific operations to be performed on the component, at each subsequent processing station (k+1 to N) of manufacturing system 102. More generally, any component $\vec{a}$ may be defined as a sequence of all operations performed at each processing station 1 ... N of manufacturing system. Mathematically, $\vec{a} = [\{r_1, t_1\}, ..., \{r_N, t_N\}]$. At each manufacturing step i=1, ..., 10, the virtual representation system may represent the component in Euclidean space (e.g., $\mathbb{R}^3$) as a set of connected surface and a set of connected points uniformly distributed along the outer contour of each surface. In some embodiments, the virtual representation functions generating these representations may be referred to as $S(\vec{a}_i)$ and $P(\vec{a}_i)$, respectively. In some embodiments, component module 204 may be configured to correct $\vec{a}_k$ toward a particular, canonical component, $\vec{a}^*$.

Simulation module 216 may be configured to simulate or generate a surface model for a given component $\hat{a}_i$. For example, simulation module 216 may receive tooling information from tooling module 202. Based on the keypoints generated by tooling module 202, simulation module 216 may be configured to generate a surface model representing a state of the component $\hat{a}_i$ at a specific process step i. In some embodiments, the surface model may be represented as $S(\vec{a}_i)$. In some embodiments, simulation module 216 may further be configured to generate or estimate a quality metric of the component $\vec{a}_i$. From the surface model, simulation module 216 may be configured to generate a points model, $P(\vec{a}_i)$, representing specific coordinates of the component, $\vec{a}_i$. For example, from surface model $S(\vec{a}_i)$, simulation module 216 may create points model, $P(\vec{a}_i)$, by placing a number of points uniformly spaced around a bounding contour of each surface in $S(\vec{a}_i)$. In some embodiments, $S(\vec{a}_i)$ may be used to simulate performance of the artifact $\vec{a}_i$.

SGD module 212 may receive the points model, $P(\vec{a}_i)$, from simulation module 216. SGD module 212 may determine whether an irreversible error, k, has occurred by comparing the points model, $P(\vec{a}_i)$, at step i to a canonical points model, $P(\vec{a}^*)$ of a canonical component, $\vec{a}^*$. An irreversible error may be defined to be a measurably significant structural deviation from a canonical component at step k. SGD module 212 may be configured to detect an irreversible error by taking a Hausdorff distance. For example, SGD module 212 may match a processing step of current component $\vec{a}$ to canonical component $\vec{a}^*$ based on respective Euclidean point sets. Mathematically, SGD module 212 may be configured to compute the Hausdorff distance between $P(\vec{a}_i)$ and $P\vec{a}^*$) for and i∈i=1, . . . , N. For example, $$h(X, Y) = \max_{x \in X}\{\min_{y \in Y}\{d(x, y)\}\}$$

where d(x, y) may be the Euclidean distance between x and y, and the undirected Hausdorff distance may be:

$$H(X,Y)=\max\{h(X,Y),h(Y,X)\}$$

An irreversible error may be present when the Hausdorff distance between the current component $\vec{a}_i$ and the canonical component $\vec{a}^*$ exceeds some threshold tolerance. For example, SGD module 212 may determine that an error occurs at step k when:

$$H(P(\vec{a}_k)),P(\vec{a}^*_k))>\tau_H$$

where $\tau_H$ is some suitably defined tolerance threshold.

Assuming an error is present, SGD module 212 may be configured to construct a set of updated actions [{$r_{k+1}$, $t_{k+1}$}, . . . , {$r_N$, $t_N$}] given a set of actions up to a point of error an irreversible error k. In some embodiments, this set of updated actions may be referred to as $x_{tail}$. The sequences of steps or actions that preceded and included the error step k may be referred to as $x_{head}$. Together, $x_{tail}$ and $x_{head}$ may define a component $\vec{a}$. Based on $x_{head}$, SGD module 212 may solve for $x_{tail}$ using a stochastic gradient descent method.

GRU model 214 may be configured to predict a final quality metric for the component, $\vec{a}_i$, based on $x_{tail} \oplus x_{head}$, where ⊕ may represent a vector concatenation operator. The final quality metric generated by GRU model 214 may be compared against a canonical final quality metric to determine if $x_{tail}$ is proper. For example, assuming that the combination of $x_{tail}$ and $x_{head}$ yields a final quality metric that falls outside of a range of acceptable values, GRU model 214 may instruct SGD module 212 to generate an updated sequence of updated actions for further evaluation.

Figure 5:
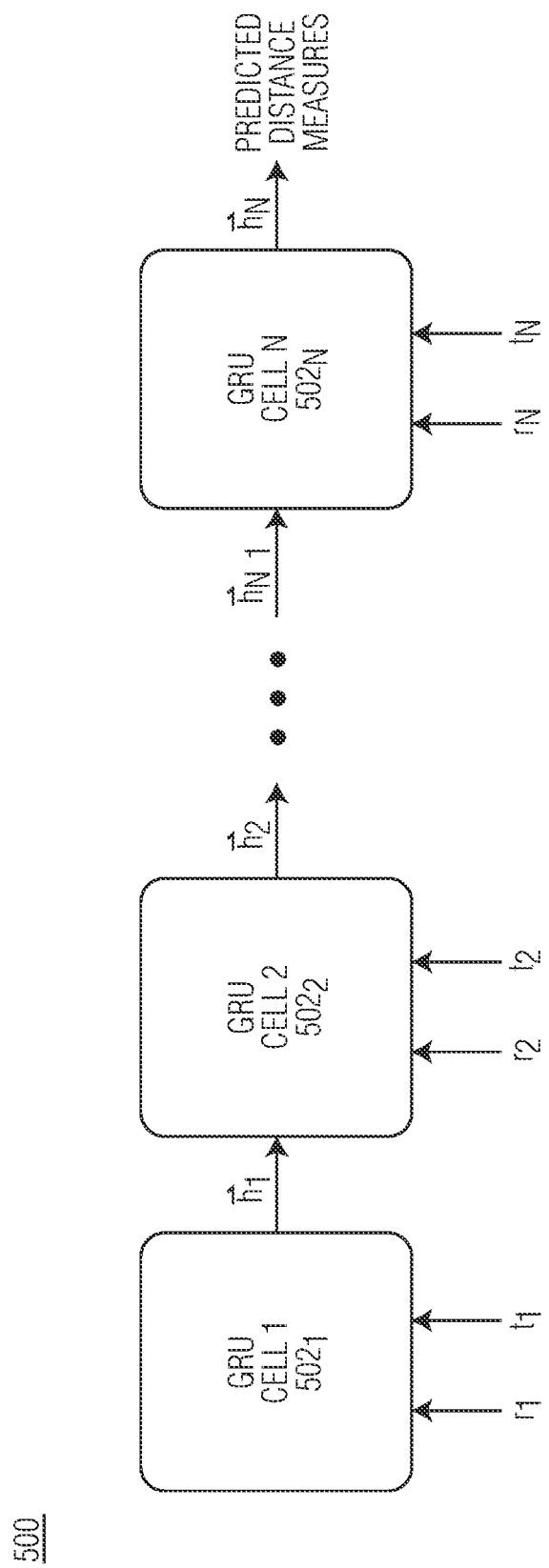
FIG. 5 is a block diagram illustrating architecture of GRU model, according to example embodiments.

FIG. 5 is a block diagram illustrating architecture of GRU model 214, according to example embodiments. As shown, GRU model 214 may include N GRU cells $502_1$-$502_N$ (generally, GRU cell 502), with each GRU cell 502 corresponding to a respective processing station 108. Each GRU cell 502 may include an ($r_i$, $t_i$) input pair and a hidden state output $\vec{h}_i$ of a predetermined size. Together, these input pairs ($r_i$, $t_i$) may define a given component $\vec{a}_i$. In some embodiments, each GRU cell 502 may be defined by:

$$\vec{r}_t = \sigma(W_{ir}\vec{x}_t + b_{ir} + W_{hr}\vec{h}_{t-1} + \vec{b}_{hr})$$

$$\vec{z}_t = \sigma(W_{iz}\vec{x}_t + \vec{b}_{iz} + W_{hz}\vec{h}_{t-1} + \vec{b}_{hz})$$

$$\vec{n}_t = \tanh(W_{in}\vec{x}_t + \vec{b}_{in} + \vec{r}_t(W_{hn}\vec{h}_{t-1} + \vec{b}_{hn}))$$

$$\vec{h}_t = (\vec{1} - \vec{z}_t)\vec{n}_t + \vec{z}_t\vec{h}_{t-1}$$

where $\vec{h}_t$ may be the hidden state at time t, $\vec{x}_t$ may be the input at time t, and $\vec{r}_t$, $\vec{z}_t$, and $\vec{n}_t$ may represent the reset, update, and new gates at time t, respectively.

GRU model 214 may be trained to generate weights corresponding thereto. For example, GRU model 214 may be trained iteratively to bias GRU model 214 toward solving a specific subproblem. In some embodiments, during a first iteration, GRU model 214 may generate a plurality (e.g., several hundred to several thousand) best predictions (one for each possible error at step k) to complete a given component $\vec{a}_k$ at steps k+1, . . . , N, along with the corresponding predicted quality metrics corresponding to each prediction.

In some embodiments, all of the predicted airplane completions may be rendered in a virtual representation system, their stepwise Hausdorff distances computed, and their rendered surfaces simulated, to obtain distance measures between the generated predictions and the canonical. In some embodiments, the loss values between the canonical and predicted quality metric measures may be computed and fed back into the GRU model 214, whose weights may be adjusted via backpropagation, producing a second iteration. This process may continue until a desired error threshold is obtained.

Figure 4:
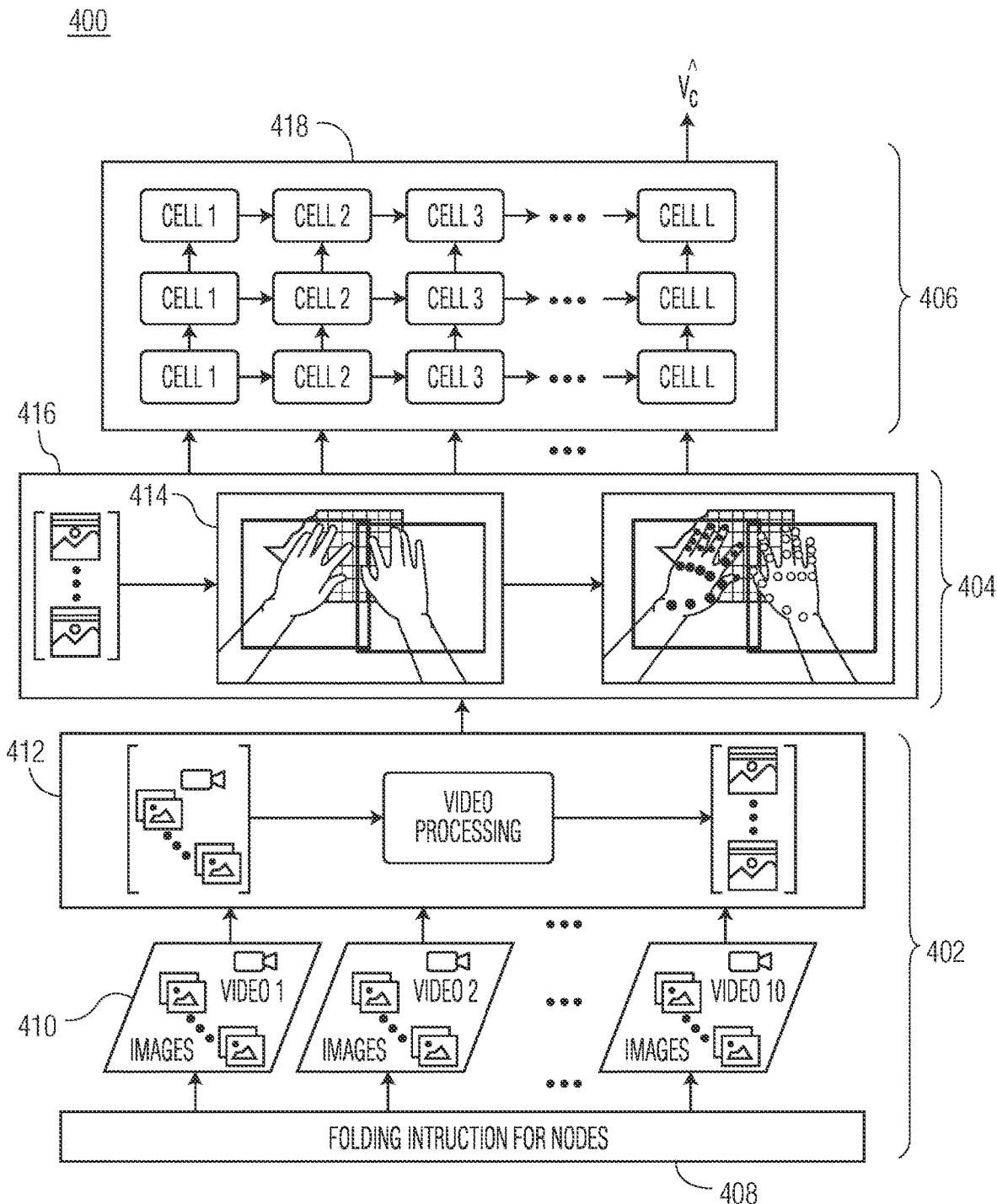
FIG. 4 is a block diagram visually illustrating the overall process flow of a feedback segment for tooling module, according to example embodiments.

FIG. 4 is a block diagram visually illustrating the overall process flow of a feedback segment 400 for tooling module 202, according to example embodiments.

As shown, feedback segment 400 may include a first portion 402, a second portion 404, and a third portion 406. During first portion 402, tooling module 202 may perform an acquisition process, such as that carried out, at least partially, by acquisition system 206.

As shown, at block 408, manufacturing system 102 may receive processing instructions for processing a component. In some embodiments, manufacturing system 102 may receive processing instructions on a per station 108 basis. For example, each station 108 of manufacturing system 102 may receive independent processing instructions. In some embodiments, processing instructions may include control values that define attributes (e.g., temperature, pressure, etc.) of a station 108 for manufacturing. In some embodiments, processing instructions may include videos or images that visually illustrate to a human operator how to perform a specific processing step at a processing node of the manufacturing process.

At block 410, acquisition system 206 may receive image data from monitoring platform 104. In some embodiments, for each node N, acquisition system 206 may receive V number of images, where V may represent the number of cameras of monitoring platform 104 that may record the assembly procedure at each node. Following receipt of the image data, at block 412, acquisition system 206 may be configured to extract a subset of images of frames. For example, acquisition system 206 may be configured to extract L number of images from the received image data. The extracted images may be referred to as landmark frames. The extracted images may include those images or frames that include certain landmarks and may represent the entire manufacturing process for the component.

Second portion 404 may correspond to operations performed by extractor module 208. As shown, extractor module 208 may receive at least the extracted images from acquisition system 206. Extractor module 208 may be configured to extract keypoints from the L number of images. For example, extractor module 208 may be configured to extract K number of keypoints, i.e., (x, y) pairs, per landmark $I_i$.

At block 414, extractor module 208 may perform bounding box estimation. For example, given $\vec{i}$, each landmark frame may be processed with a threshold image segmentation to generate a mask image for each tooling component. For example, as shown, in an embodiment in which the tooling is a human, extractor module 208 may generate a mask image for each of the user's hands.

At block 416, extractor module 208 may perform keypoint detection, given the bounding box estimation. For example, with given input, extractor module 208 may estimate K number of points, $\vec{p}_i$, along with its confidence value, $\vec{c}_i$. In some embodiments, extractor module 208 may estimate, not only the points that are visible on the frame, but also points that may be occluded from the frame due to one or more of articulation, viewpoints, objects, or tool interactions.

Third portion 406 may correspond to operations performed by prediction module 210. As shown, at block 418, prediction module 210 may receive keypoint information from extractor module 208 and may be configured to predict a final quality metric, $\hat{V}_c$. In some embodiments, prediction module 210 may implement a long short-term memory (LSTM) model to output the final quality metric.

Figure 6A:
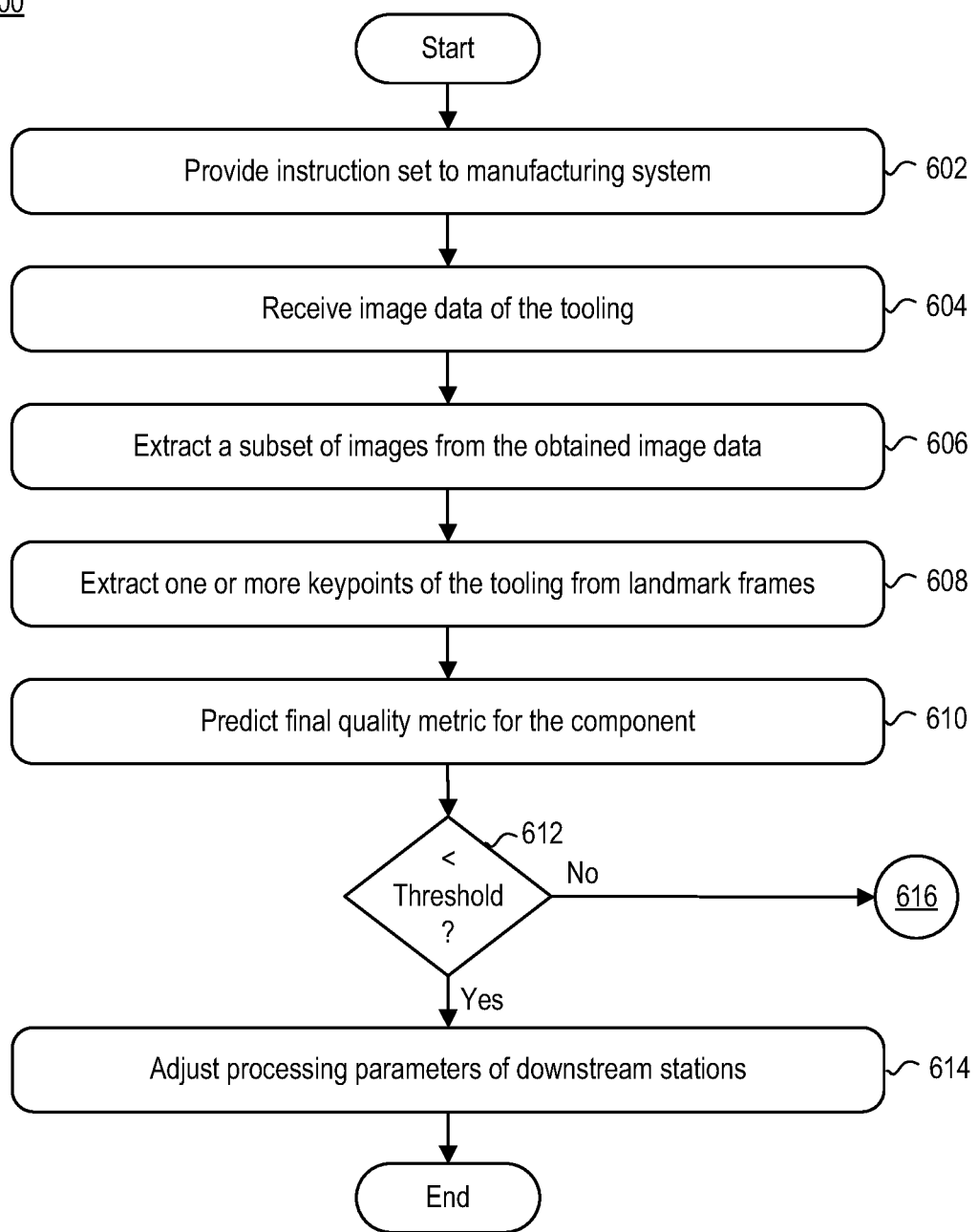
FIG. 6A is a flow diagram illustrating a method of correcting a multi-step manufacturing process, according to example embodiments.

FIG. 6A is a flow diagram illustrating a method 600 of correcting a multi-step manufacturing process, according to example embodiments. Method 600 may begin at step 602.

At step 602, an instruction set may be provided to manufacturing system 102. The instruction set may be representative of a set of instructions for a manufacturing process to be carried out by manufacturing system 102. In some embodiments, the instruction set may be provided to each station 108. For example, each canonical instruction set provided to each respective station 108 may define the processing parameters for a specific manufacturing step. In another example, each canonical instruction set may be a video of discrete steps to be performed by a human actor at a specific processing node or station 108.

At step 604, control module 106 may receive image data of the tooling (e.g., station 108) from monitoring platform 104. For example, acquisition system 206 may receive image data of the assembly process at a respective processing node. In some embodiments, acquisition system 206 may receive V number of images, where V may represent the number of cameras of monitoring platform 104 that may record the assembly procedure at a specific procession station 108. Accordingly, each image of the V number of images may capture a different perspective of the tooling during processing.

At step 606, control module 106 may extract a subset of images from the obtained image data. For example, following receipt of the image data, acquisition system 206 may be configured to extract a subset of images of frames. For example, acquisition system 206 may be configured to extract L number of images, i.e., landmark frames, from the received image data. The extracted images may be referred to as landmark frames. Landmark frames may be those image frames that are in high motion. The extracted images may include those images or frames that include certain landmarks, $\vec{i}$, of the component, where $\vec{i} = [i_0, i_1, \ldots, i_{L-1}]$, and may represent the entire manufacturing process for the component.

At step 608, control module 106 may extract one or more keypoints of the tooling from the landmark frames. For example, extractor module 208 may extract keypoints from the L number of images. Extractor module 208 may identify or extract K number of keypoints for a given input, $I_i \in \mathbb{R}^{w \times h}$, where $i \in [0, L-1]$. As output, extractor module 208 may generate a single vector $\vec{p} = [\vec{p}_0, \vec{p}_1, \ldots, \vec{p}_{L-1}]$. This vector may include landmark representations of K number of (x, y) pairs which may be represented by $\vec{p}_i = [(x_0, y_0), (x_1, y_1), \ldots (x_{K-1}, y_{K-1})]$, where $i \in [0, L-1]$.

At step 610, control module 106 may predict a final quality metric for the component based on at least the identified keypoints. In some embodiments, prediction module 210 may implement a long short-term memory (LSTM) model to output the final quality metric.

At step 612, control module 106 may compare the final quality metric to a desired quality metric. If, at step 612, control module 106 determines that the final quality metric is a threshold tolerance of the desired quality metric, the manufacturing process may proceed to the next processing station or node (e.g., step 616), in accordance with the original instruction set. If, however, at step 612, control module 106 determines that the final quality metric is not within a threshold tolerance of the desired quality metric, then, at step 614 control module 106 may adjust the processing parameters of downstream processing stations. In some embodiments, control module 106 may interface with station controllers in subsequent stations 108 to adjust their respective control and/or station parameters. In some embodiments, control module 106 may provide human manufacturers with updated instructions to be performed at each downstream processing station of a production line. These adjustments may aid in correcting the manufacturing process, such that the final quality metric may be within the range of acceptable quality metrics.

Figure 6B:
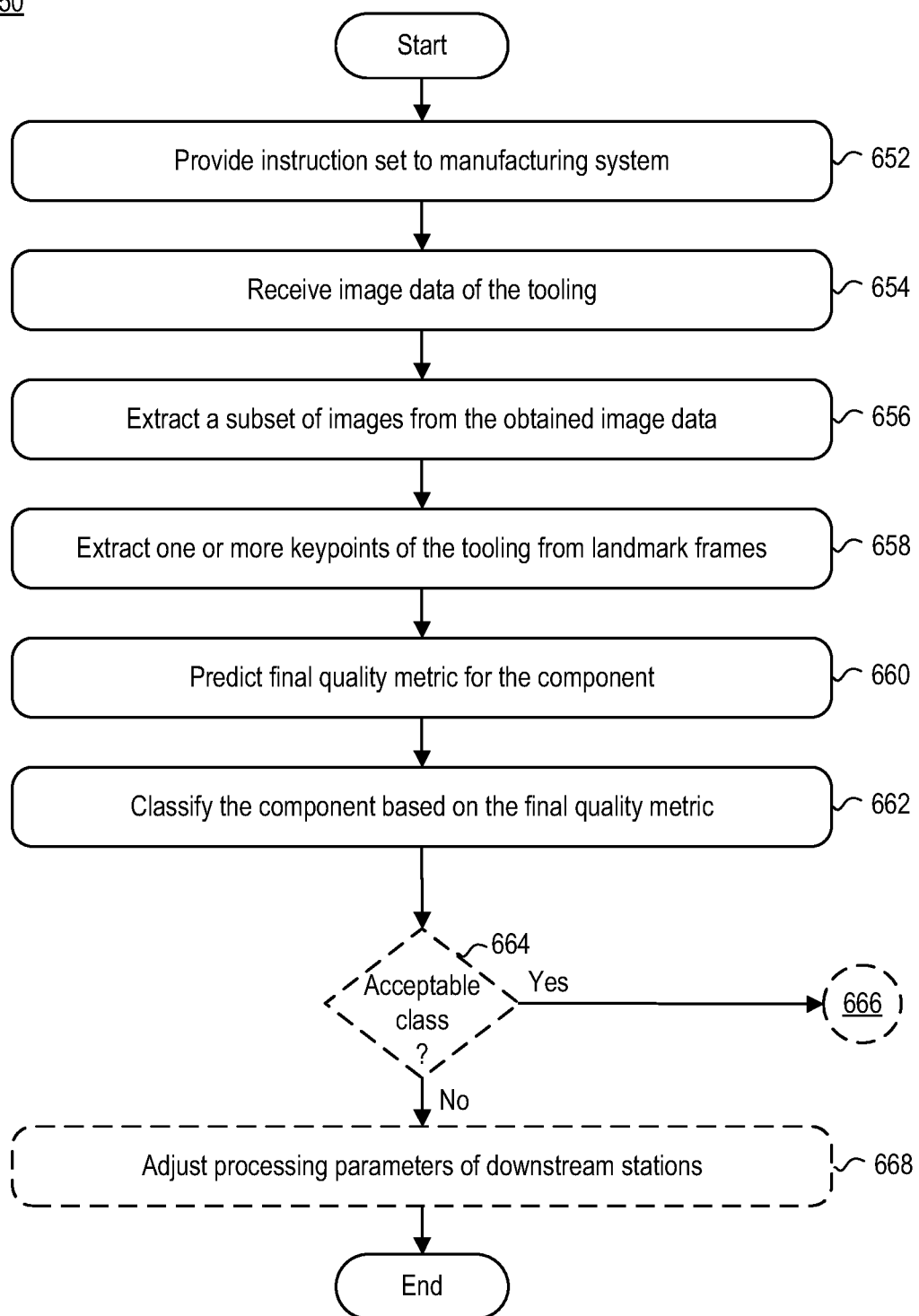
FIG. 6B is a flow diagram illustrating a method of correcting a multi-step manufacturing process, according to example embodiments.

FIG. 6B is a flow diagram illustrating a method 650 of correcting a multi-step manufacturing process, according to example embodiments. Method 650 may begin at step 652.

At step 652, an instruction set may be provided to manufacturing system 102. The instruction set may be representative of a set of instructions for a manufacturing process to be carried out by manufacturing system 102. In some embodiments, the instruction set may be provided to each station 108. For example, each canonical instruction set provided to each respective station 108 may define the processing parameters for a specific manufacturing step. In another example, each canonical instruction set may be a video of discrete steps to be performed by a human actor at a specific processing node or station 108.

At step 654, control module 106 may receive image data of the tooling (e.g., station 108) from monitoring platform 104. For example, acquisition system 206 may receive image data of the assembly process at a respective processing node. In some embodiments, acquisition system 206 may receive V number of images, where V may represent the number of cameras of monitoring platform 104 that may record the assembly procedure at a specific procession station 108. Accordingly, each image of the V number of images may capture a different perspective of the tooling during processing.

At step 656, control module 106 may extract a subset of images from the obtained image data. For example, following receipt of the image data, acquisition system 206 may be configured to extract a subset of images of frames. For example, acquisition system 206 may be configured to extract L number of images, i.e., landmark frames, from the received image data. The extracted images may be referred to as landmark frames. Landmark frames may be those image frames that are in high motion and may contain the most meaningful features that clearly captures the progress of the manufacturing process. The extracted images may include those images or frames that include certain landmarks, $\vec{i}$, of the component, where $\vec{i} = [i_0, i_1, \ldots, i_{L-1}]$, and may represent the entire manufacturing process for the component.

At step 658, control module 106 may extract one or more keypoints of the tooling from the landmark frames. For example, extractor module 208 may extract keypoints from the L number of images. Extractor module 208 may identify or extract K number of keypoints for a given input, $I_l \in \mathbb{R}^{w \times h}$, where $l \in [0, L-1]$. As output, extractor module 208 may generate a single vector $\vec{p} = [\vec{p_0}, \vec{p}_1, \ldots, \vec{p}_{L-1}]$. This vector may include landmark representations of K number of (x, y) pairs which may be represented by $\vec{p}_i = [(x_0, y_0), (x_1, y_1), \ldots (x_{K-1}, y_{K-1})]$, where $i \in [0, L-1]$.

At step 660, control module 106 may predict a final quality metric for the component based on at least the identified keypoints. In some embodiments, prediction module 210 may implement a long short-term memory (LSTM) model to output the estimate of the final quality metric.

At step 662, control module 106 may classify the component based on the final quality metric. For example, classification module 215 may classify the component into one or more classes based on the predicted final quality metric, $\hat{V}_c$. To classify the component, tooling module 202 may receive a canonical or desired final quality metric, $V_c$, for the component. Tooling module 202 may be configured to compare the predicted final quality metric, $V_c$, to the canonical or desired final quality metric, $V_c$, to generate a delta, $\Delta_V$. Depending on the value of $\Delta_V$, classification module 215 may sort the component into one or more classes.

In some embodiments, method 650 may further include operations 664-668.

At step 614, control module 106 may determine if the class assigned to the component is an acceptable class. If, at step 614, control module 106 determines that component has been assigned to an acceptable class, the manufacturing process may proceed to the next processing station or node (e.g., step 616), in accordance with the original instruction set. If, however, at step 614, control module 106 determines that component is assigned to an unacceptable class, then, at step 618 control module 106 may adjust the processing parameters of downstream processing stations. In some embodiments, control module 106 may interface with station controllers in subsequent stations 108 to adjust their respective control and/or station parameters. In some embodiments, control module 106 may provide human manufacturers with updated instructions to be performed at each downstream processing station of a production line. These adjustments may aid in correcting the manufacturing process, such that the final quality metric may be within the range of acceptable quality metrics.

Figure 7:
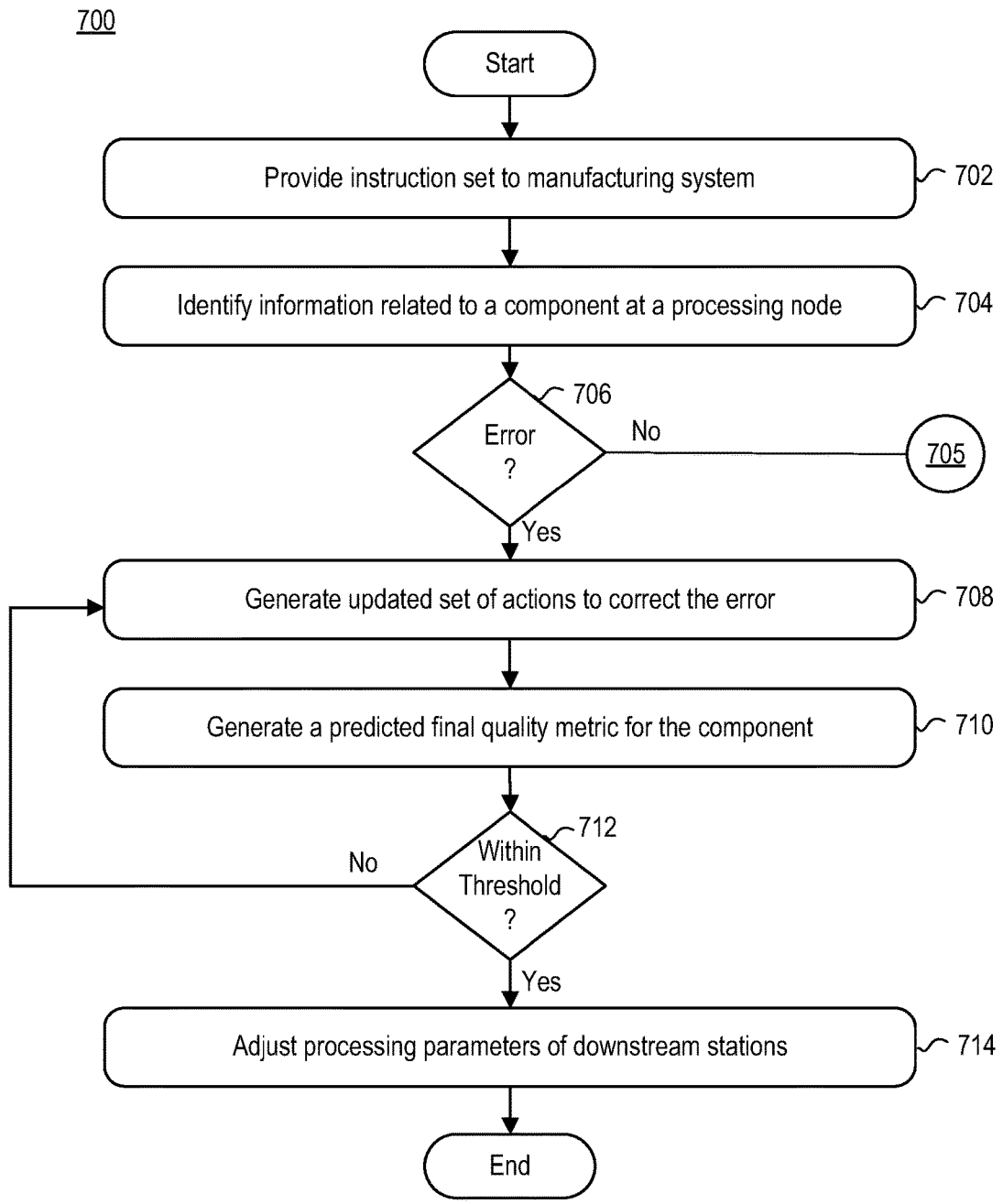
FIG. 7 is a flow diagram illustrating a method of correcting a multi-step manufacturing process, according to example embodiments.

FIG. 7 is a flow diagram illustrating a method 700 of correcting a multi-step manufacturing process, according to example embodiments. Method 700 may begin at step 702.

At step 702, an instruction set may be provided to manufacturing system 102. The instruction set may be representative of a set of instructions for a manufacturing process to be carried out by manufacturing system 102. In some embodiments, the instruction set may be provided to each station 108. For example, each canonical instruction set provided to each respective station 108 may define the processing parameters for a specific manufacturing step. In another example, each canonical instruction set may be a video of discrete steps to be performed by a human actor at a specific processing node or station 108.

At step 704, control module 106 may identify information corresponding to a component at a respective processing node. In some embodiments, simulation module 216 may receive tooling information from tooling module 202. Based on the keypoints generated by tooling module 202, simulation module 216 may be configured to generate a surface model representing a state of the component $\hat{a}_i$ at a specific process step i. In some embodiments, the surface model may be represented as $S(\vec{a}_i)$. In some embodiments, simulation module 216 may further be configured to generate or estimate a quality metric of the component $\vec{a}_i$. From the surface model, simulation module 216 may be configured to generate a points model, $P(\vec{a}_i)$, representing specific coordinates of the component, $\vec{a}_i$.

At step 706, control module 106 may determine whether an irreversible error has occurred. For example, SGD module 212 may receive points model, $P(\vec{a}_i)$, from simulation module 216. SGD module 212 may determine whether an irreversible error, k, has occurred by comparing the points model, $P(\vec{a}_i)$ at step i to a canonical points model, $P(\vec{a}^*)$ of a canonical component, $\vec{a}^*$. SGD module 212 may be configured to detect an irreversible error by taking a Hausdorff distance between the points model and the corresponding canonical points model. An irreversible error may be present when the Hausdorff distance between the current component $\vec{a}_i$ and the canonical component $\vec{a}^*$, at the respective processing station or node, exceeds some threshold tolerance.

If at step 706, control module 106 determines that an irreversible error has not occurred, then the manufacturing process may proceed to the next processing station or node (step 705), in accordance with the original instruction set. If, however, at step 706, control module 106 determines that an irreversible error has occurred, then method 700 proceed to step 708.

At step 708, control module 106 may generate an updated set of actions to correct the irreversible error. SGD module 212 may construct a set of updated actions $[\{r_{k+1}, t_{k+1}\}, \ldots, \{r_N, t_N\}]$ given a set of actions up to a point of error an irreversible error k. In some embodiments, this set of updated actions may be referred to as $x_{tail}$. The sequences of steps or actions that preceded and included the error step k may be referred to as $x_{head}$. Together, $x_{tail}$ and $x_{head}$ may define a component $\vec{a}_i$. Based on $x_{head}$, SGD module 212 may solve for $x_{tail}$ using a stochastic gradient descent method. The sequences of steps or actions that preceded and included the error step k may be referred to as $x_{head}$.

Together, $x_{tail}$ and $x_{head}$ may define a component $\hat{a}_i$. Based on $x_{head}$, SGD module 212 may solve for $x_{tail}$ using a stochastic gradient descent method.

At step 710, control module 106 may generate a predicted final quality metric for the component, based on the set of actions generated by SGD module 212. For example, GRU model 214 may be configured to predict a final quality metric for the component, $\hat{a}_i$, based on $x_{tail} \oplus x_{head}$, where $\oplus$ may represent a vector concatenation operator.

At step 712, control module 106 may determine if the predicted final quality metric is within a threshold tolerance of the canonical final quality metric. For example, the final quality metric generated by GRU model 214 may be compared against a canonical final quality metric to determine if $x_{tail}$ is proper. If, at step 712, control module 106 determines that the predicted quality metric is within the threshold tolerance, at step 714, control module 106 may adjust the processing parameters of downstream processing stations. In some embodiments, control module 106 may interface with station controllers in subsequent stations 108 to adjust their respective control and/or station parameters. In some embodiments, control module 106 may provide human manufacturers with updated instructions to be performed at each downstream processing station of a production line. These adjustments may aid in correcting the manufacturing process, such that the final quality metric may be within the range of acceptable quality metrics.

If, however, at step 712, control module 106 determines that the predicted quality metric is not within the threshold tolerance, GRU model 214 may prompt SGD module 212 to generate a new $x_{tail}$. For example, method 700 may revert to step 708 for SGD module 212 to construct a new set of updated actions.

Figure 8A:
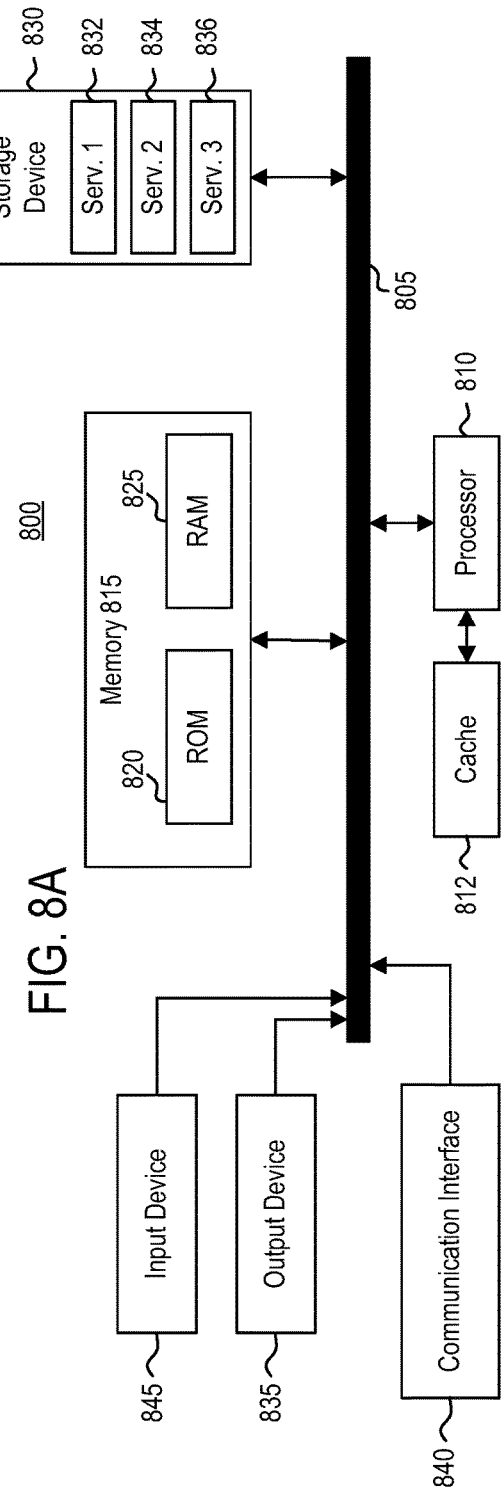
FIG. 8A illustrates a system bus computing system architecture, according to example embodiments.

FIG. 8A illustrates a system bus computing system architecture 800, according to example embodiments. One or more components of system 800 may be in electrical communication with each other using a bus 805. System 800 may include a processor (e.g., one or more CPUs, GPUs or other types of processors) 810 and a system bus 805 that couples various system components including the system memory 815, such as read only memory (ROM) 820 and random access memory (RAM) 825, to processor 810. System 800 can include a cache of high-speed memory connected directly with, in close proximity to, or integrated as part of processor 810. System 800 can copy data from memory 815 and/or storage device 830 to cache 812 for quick access by processor 810. In this way, cache 812 may provide a performance boost that avoids processor 810 delays while waiting for data. These and other modules can control or be configured to control processor 810 to perform various actions. Other system memory 815 may be available for use as well. Memory 815 may include multiple different types of memory with different performance characteristics. Processor 810 may be representative of a single processor or multiple processors. Processor 810 can include one or more of a general purpose processor or a hardware module or software module, such as service 1 832, service 2 834, and service 3 836 stored in storage device 830, configured to control processor 810, as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing device 800, an input device 845 which can be any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with computing device 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include services 832, 834, and 836 for controlling the processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, display 835, and so forth, to carry out the function.

Figure 8B:
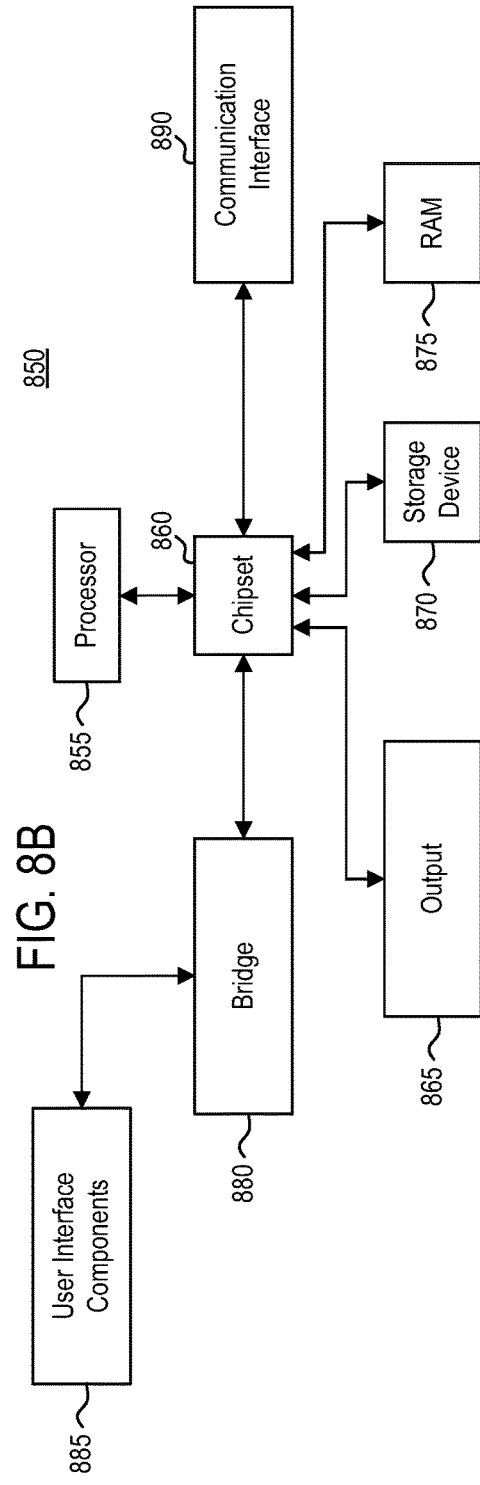
FIG. 8B illustrates a computer system having a chipset architecture, according to example embodiments.

FIG. 8B illustrates a computer system 850 having a chipset architecture, according to example embodiments. Computer system 850 may be an example of computer hardware, software, and firmware that can be used to implement the disclosed technology. System 850 can include one or more processors 855, representative of any number of physically and/or logically distinct resources capable of executing software, firmware, and hardware configured to perform identified computations. One or more processors 855 can communicate with a chipset 860 that can control input to and output from one or more processors 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 855 analyzing data stored in storage 870 or 875. Further, the machine can receive inputs from a user through user interface components 885 and execute appropriate functions, such as browsing functions by interpreting these inputs using one or more processors 855.

It can be appreciated that example systems 800 and 850 can have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A manufacturing system, comprising:
a first station and a second station, each of the first station and the second station configured to perform at least one step in a multi-step manufacturing process for a component;
a monitoring platform configured to monitor progression of the component throughout the multi-step manufacturing process; and
a control module configured to dynamically adjust processing parameters of a step of the multi-step manufacturing process to achieve a desired final quality metric for the component, the control module configured to perform operations, comprising:
receiving image data of tooling of the first station, wherein the first station is upstream of the second station;
identifying a set of keypoints on the tooling from the image data, the set of keypoints corresponding to position information of the tooling during processing at the first station;
projecting, by a machine learning model, a final quality metric for the component, based on the set of keypoints, the final quality metric representing a metric quality of the component that cannot be measured until the multi-step manufacturing process is complete; and
assigning the component to a class of components based on a comparison between the projected final quality metric and a canonical final quality metric for the component.

2. The manufacturing system of claim 1, wherein the operations further comprise:
determining that the final quality metric is not within a threshold tolerance from the final quality metric; and
based on the determining, updating processing parameters of the second station in the multi-step manufacturing process.

3. The manufacturing system of claim 1, wherein the image data comprises a plurality of images, each image corresponding to a respective camera.

4. The manufacturing system of claim 1, wherein the operations further comprise:
extracting, from the image data, a subset of images, wherein each image of the subset of images includes the tooling of the first station.

5. The manufacturing system of claim 4, further comprises:
generating a number of points corresponding to the tooling in the image data.

6. The manufacturing system of claim 1, wherein identifying the set of keypoints from the image data comprises:
applying blob detection to the image data to identify a location of the tooling in the image data.

7. The manufacturing system of claim 1, wherein the machine learning model is a long short-term memory model.

8. A computer-implemented method for controlling a multi-step manufacturing process involving a first station and a second station of a manufacturing system, each of the first station and the second station configured to perform at least one step in the multi-step manufacturing process for a component, the computer-implemented method comprising:
receiving, by a computing system associated with the manufacturing system, image data of tooling of the first station, wherein the first station is upstream of the second station;
identifying, by the computing system, a set of keypoints from the image data, the set of keypoints corresponding to position information of the tooling during processing at the first station;
projecting, by a machine learning model associated with the computing system, a final quality metric for the component, based on the set of keypoints, the final quality metric representing a quality metric of the component that cannot be measured until the multi-step manufacturing process is complete; and
assigning, by the computing system, the component to a class of components based on a comparison between the projected final quality metric and a canonical final quality metric for the component.

9. The computer-implemented method of claim 8, further comprising:
determining, by the computing system, that the final quality metric is not within a threshold tolerance from the final quality metric; and
based on the determining, updating, by the computing system, processing parameters of the second station in the multi-step manufacturing process.

10. The computer-implemented method of claim 8, wherein the image data comprises a plurality of images, each image corresponding to a respective camera.

11. The computer-implemented method of claim 8, further comprising:

extracting, from the image data, a subset of images, wherein each image of the subset of images includes the tooling of the first station.

12. The computer-implemented method of claim 8, wherein identifying, by the computing system, the set of keypoints from the image data comprises:

applying blob detection to the image data to identify a location of the tooling in the image data.

13. The computer-implemented method of claim 12, further comprising:

generating, by the computing system, a number of points corresponding to the tooling in the image data.

14. The computer-implemented method of claim 8, wherein the machine learning model is a long short-term memory model.

15. A manufacturing system, comprising:

a first station and a second station, each of the first station and the second station configured to perform at least one step in a multi-step manufacturing process for a component;

a monitoring platform configured to monitor progression of the component throughout the multi-step manufacturing process; and a control module configured to dynamically adjust processing parameters of a step of the multi-step manufacturing process to achieve a desired final quality metric for the component, the control module configured to perform operations, comprising:

receiving image data of tooling of the first station, wherein the first station is upstream of the second station;

identifying a set of keypoints on the tooling from the image data, the set of keypoints corresponding to position information of the tooling during processing at the first station;

projecting, by a machine learning model, a final quality metric for the component, based on the set of keypoints, the final quality metric representing a metric quality of the component that cannot be measured until the multi-step manufacturing process is complete;

assigning the component to a class of components based on a comparison between the projected final quality metric and a canonical final quality metric for the component;

based on the assigning, determining that the class assigned to the component is not an acceptable class;

based on the determining, inferring positional information corresponding to the component at the first station;

based on the determining, generating an updated instruction set to be performed by the second station;

predicting, by the machine learning model, an updated final quality metric for the component based on the updated instruction set; and based on the updated predicted final quality metric, providing the updated instruction set to the second station.

16. The manufacturing system of claim 15, further comprising:

determining, based on the positional information corresponding to the component, that an irreversible error is present.

17. The manufacturing system of claim 16, further comprising:

comparing the set of keypoints corresponding to coordinates of the component to a canonical set of keypoints corresponding to a canonical component.

\* \* \* \* \*